United States Patent [19]

MacMillan

[11] Patent Number: 5,120,209
[45] Date of Patent: Jun. 9, 1992

[54] APPARATUS FOR MOLDING TIRE TREADS

[76] Inventor: Kenneth T. MacMillan, 115 Oxford Sq., Carrollton, Ga. 30117

[21] Appl. No.: 459,399

[22] Filed: Dec. 29, 1989

[51] Int. Cl.$^5$ .................. B29C 33/04; B29C 35/04
[52] U.S. Cl. ............................. 425/40; 425/46; 425/47; 264/326
[58] Field of Search ............ 264/315, 36, 326, 297.5; 425/19, 20, 47, 23, 46, 55, 39, 54, 40

[56] References Cited

U.S. PATENT DOCUMENTS

| | | | |
|---|---|---|---|
| 1,632,310 | 6/1927 | Paynter | 425/46 |
| 1,975,038 | 9/1934 | Glazner | 425/55 |
| 2,606,342 | 8/1952 | Kraft | 425/23 |
| 2,679,662 | 6/1954 | Pfeiffer | 425/23 |
| 2,874,415 | 2/1959 | Pollock | 425/55 |
| 3,990,821 | 11/1976 | MacMillan | 425/19 |
| 3,999,907 | 12/1976 | Pappas | 425/39 |
| 4,263,083 | 4/1981 | Schleiger | 264/326 |

*Primary Examiner*—Jan H. Silbaugh
*Assistant Examiner*—Mathieu Vargot
*Attorney, Agent, or Firm*—Diller, Ramik & Wight

[57] ABSTRACT

An apparatus for molding articles, particularly tires, of different diameters/circumferences including a plurality of pitches defining a mold cavity, the pitches having transverse faces in generally face-to-face abutment in a closed position of the mold cavity, and at least several of the pitches being of different lengthwise sizes. The pitches in the closed position of the mold cavity defining a predetermined mold configuration which includes portions at angles to the length of the article molded in the mold cavity. The mold configuration matches lengthwise across all of the transverse faces irrespective of the location of the pitches relative to each other and irrespective of the number of the pitches. The latter arrangement permits articles, such as new or retread tires, of different lengths but of the generally same predetermined mold configuration to be molded in a single mold.

75 Claims, 14 Drawing Sheets

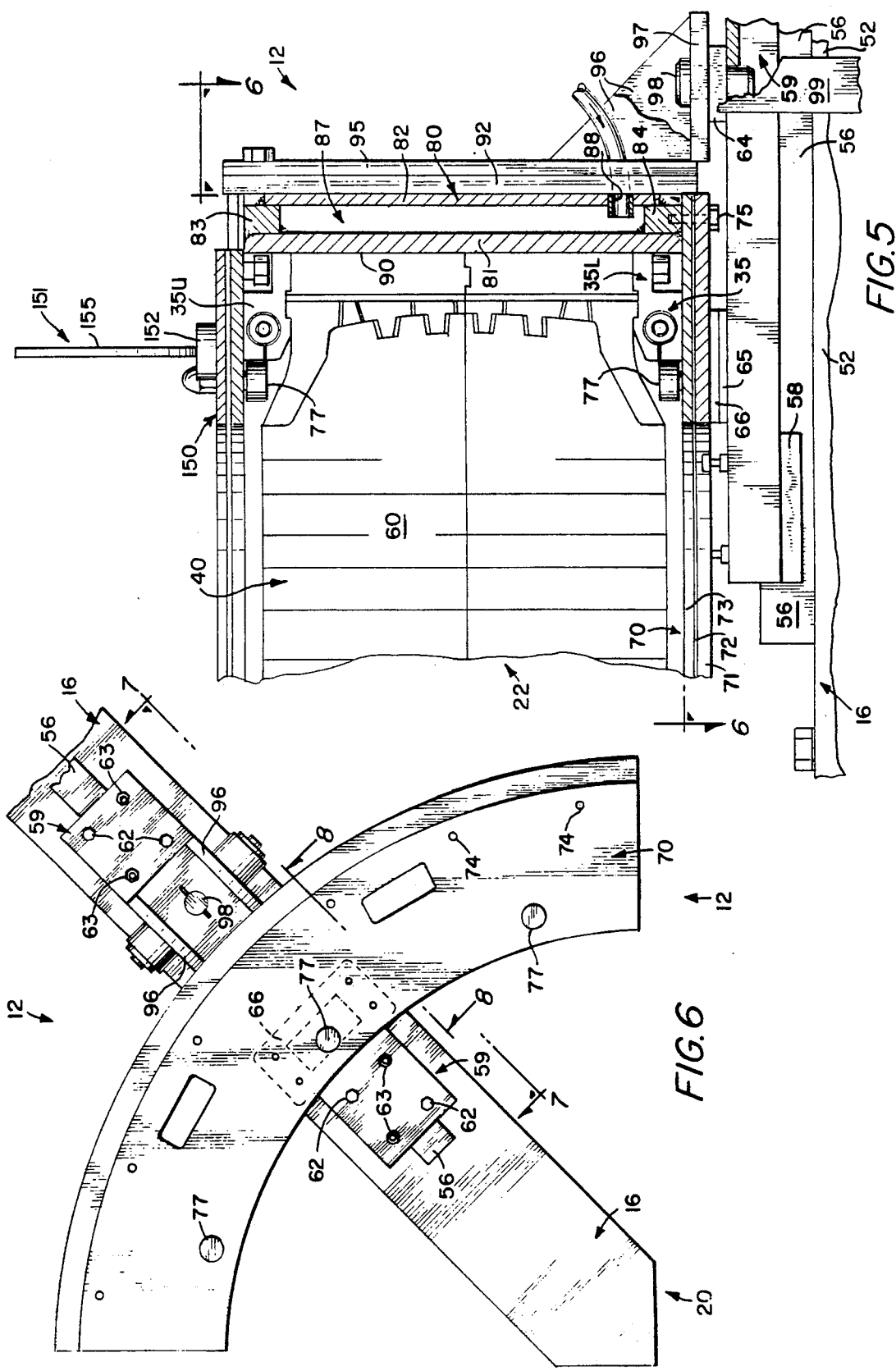

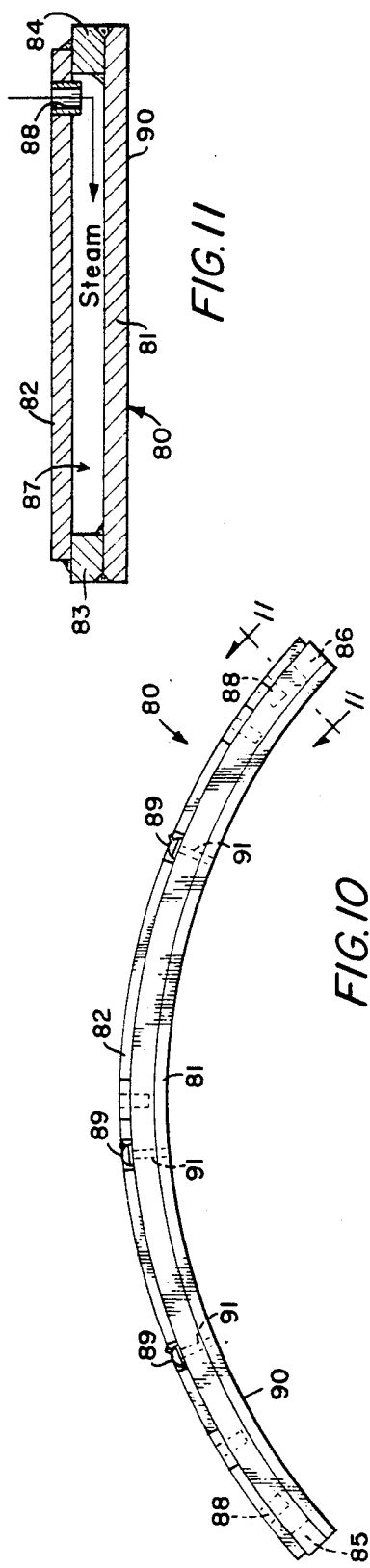
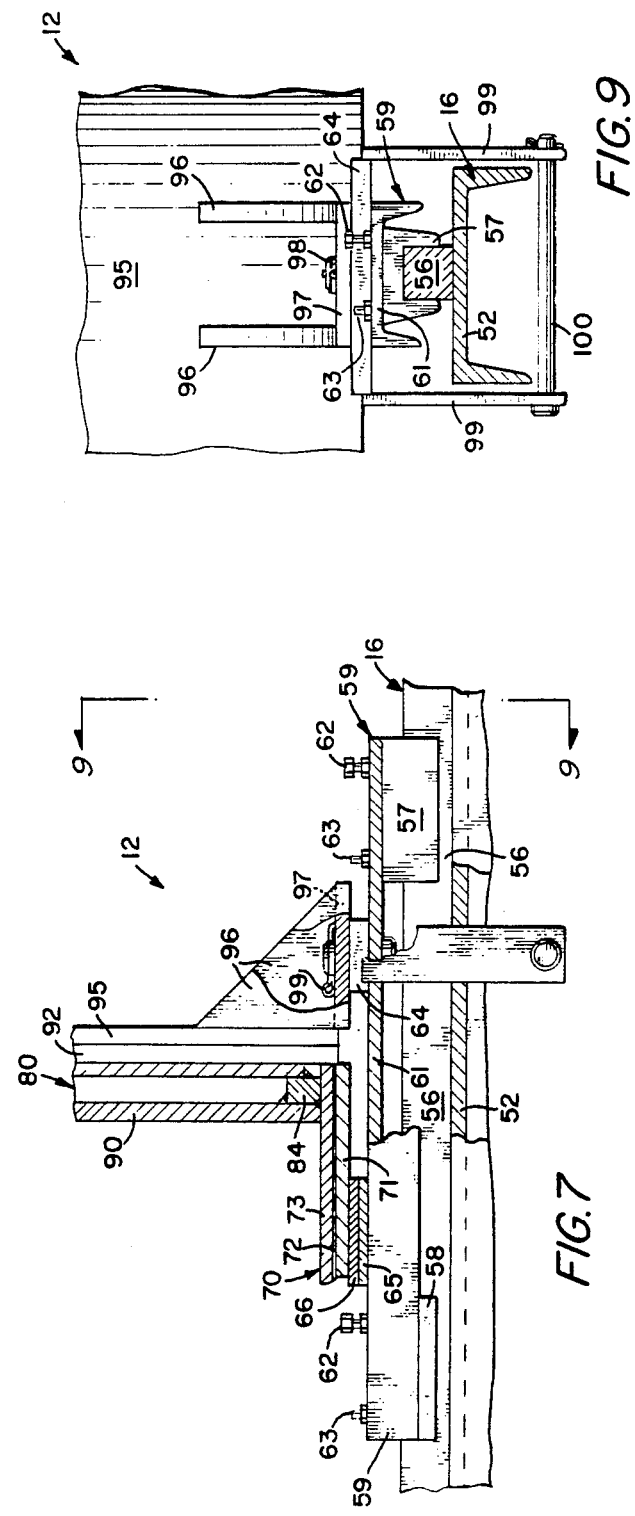

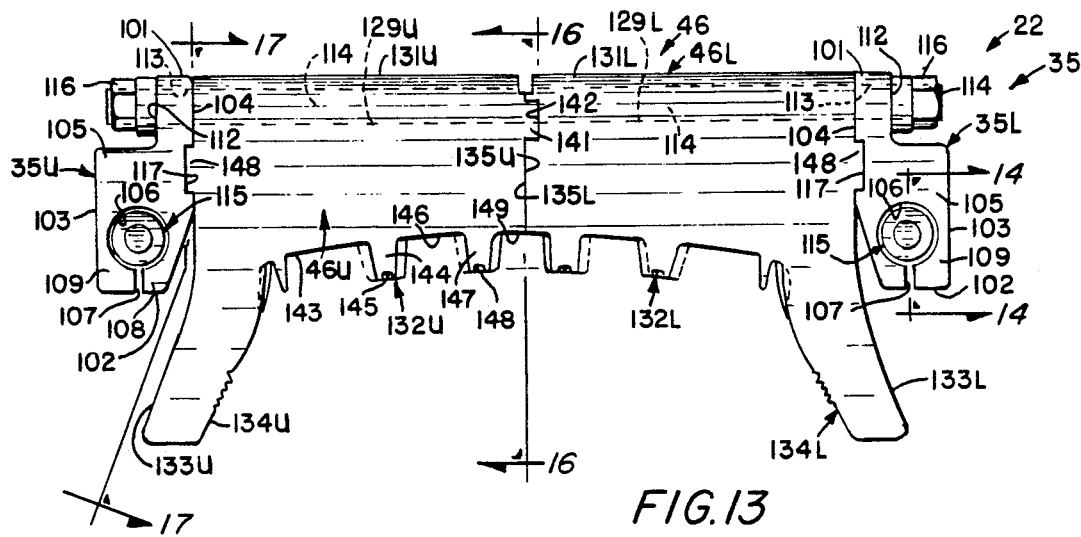
FIG.13
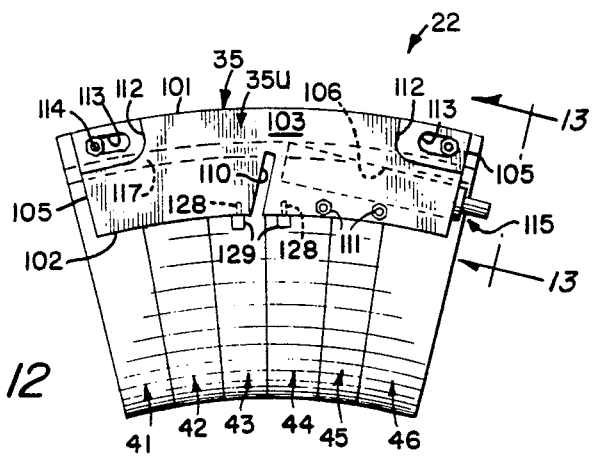
FIG.12
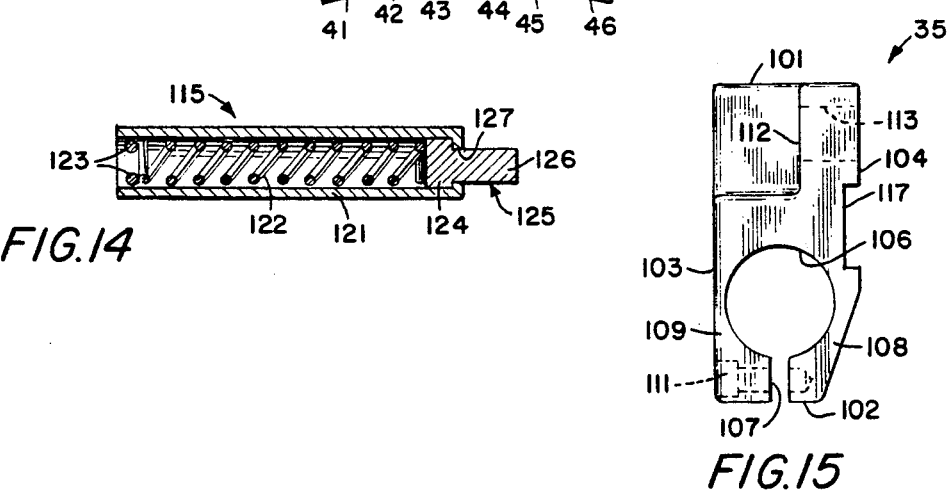
FIG.14
FIG.15

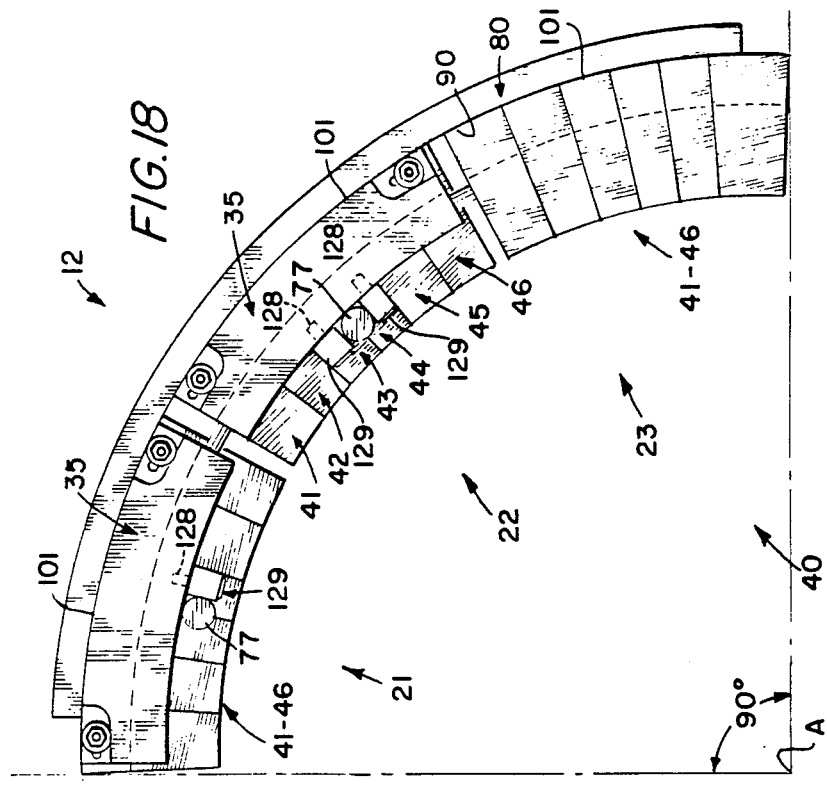
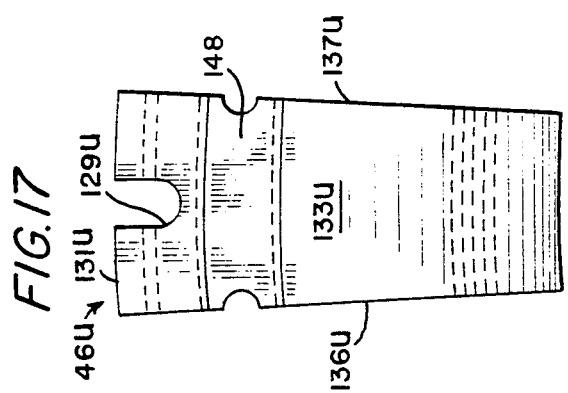
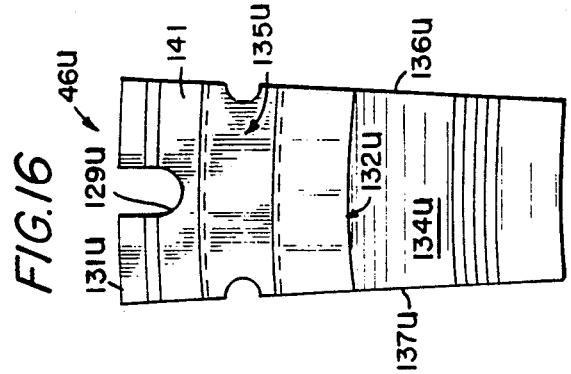
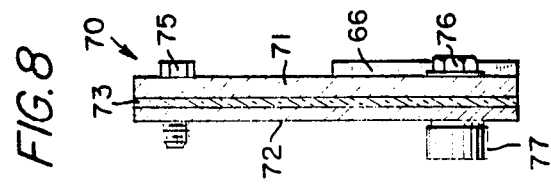

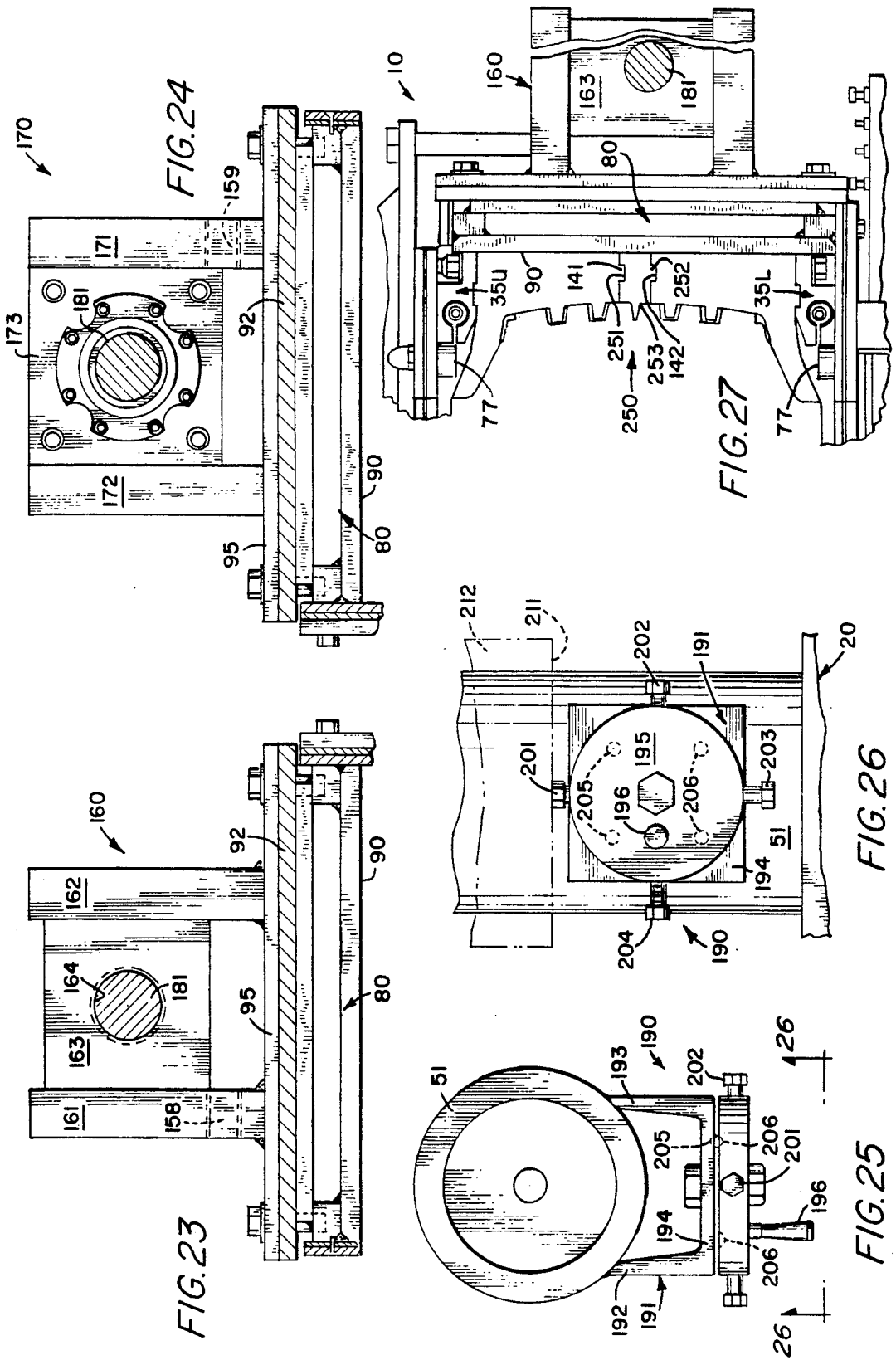

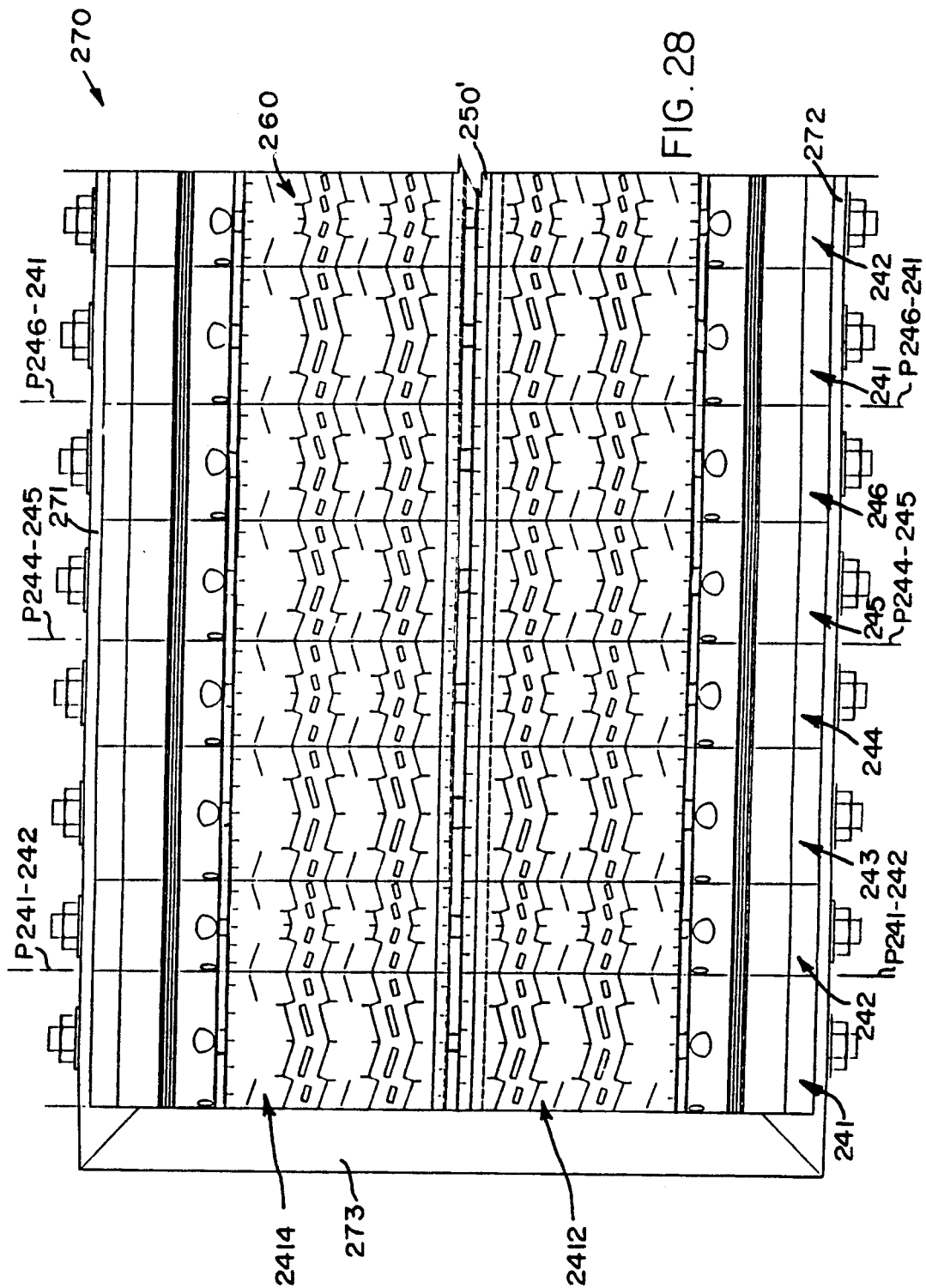

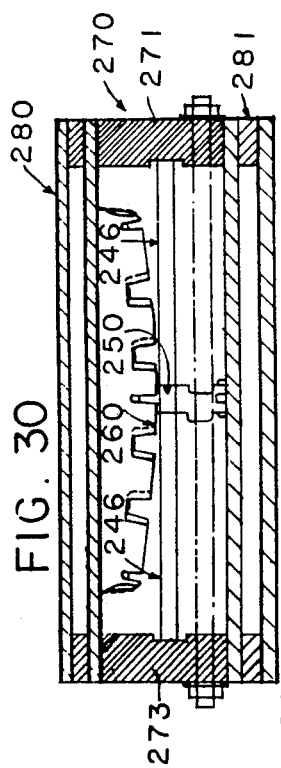
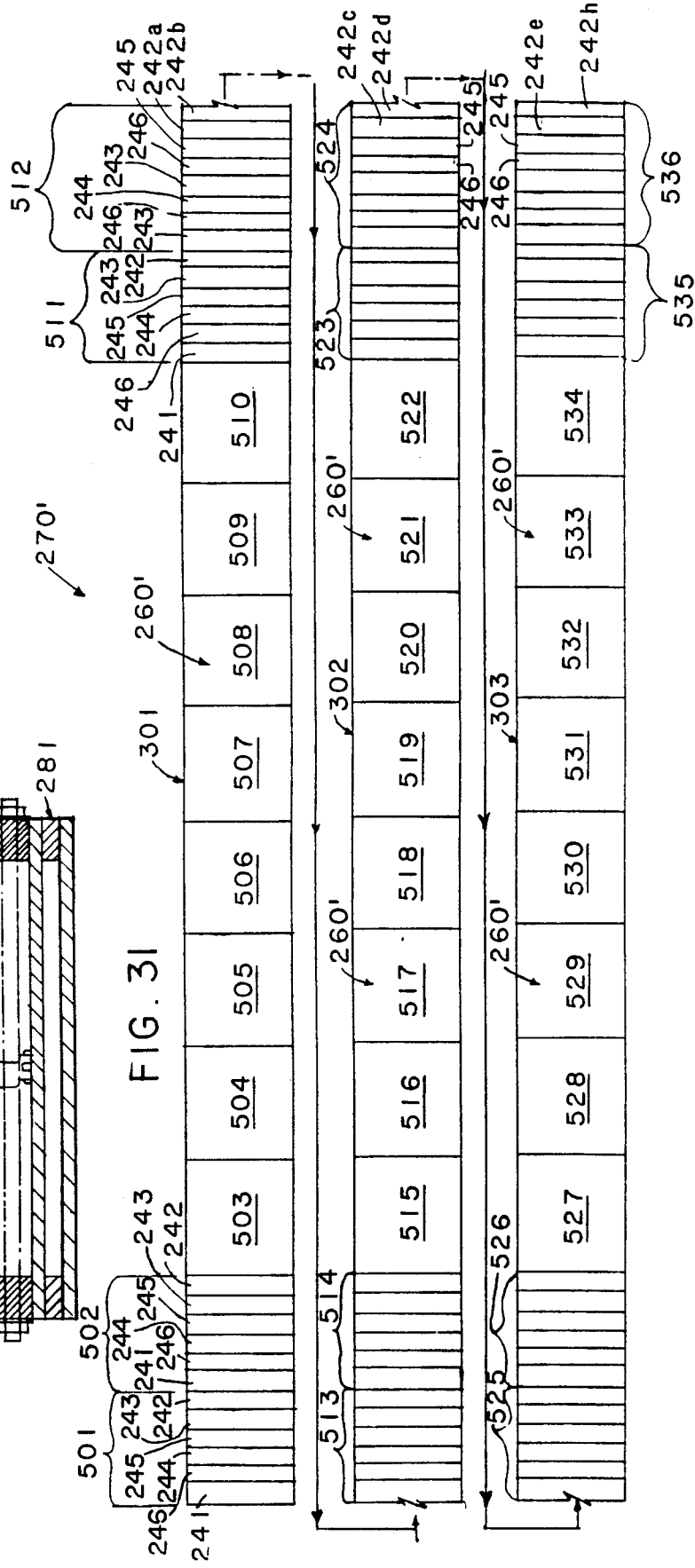
FIG. 30
FIG. 31

APPARATUS FOR MOLDING TIRE TREADS

BACKGROUND OF THE INVENTION

The invention is directed to a novel mold for molding articles, particularly applying tread to tires or retreading tires, and novel methods associated therewith. However, though the invention is primarily directed to the field of manufacturing new or retread tires, it is equally applicable to molding virtually any object and particularly objects of different sizes which are molded in a single mold.

The related art is particularly characterized by many patents in the name of Kenneth T. MacMillan, typical of which is exemplified by U.S. Pat. No. 3,990,821 issued Nov. 9, 1976. The latter patent discloses a plurality of matrices movable between open and closed positions thereof with the latter position defining a generally annular chamber having a vertical axis. An example of a similar retreading apparatus is disclosed in U.S. Pat. No. 3,042,966 issued Jul. 10, 1962 to William J. Laycox which also discloses a plurality of matrices movable between open and closed positions thereof with the latter position defining a generally annular chamber having a horizontal axis. Reference can also be made to the various patents cited in U.S. Pat. No. 3,990,821, and many other patents most notably classified in U.S. Cl. 425/19 et seq.

SUMMARY OF THE INVENTION

The present invention is directed to a novel apparatus for molding articles of different lengths, including different circumferences, in a mold cavity, be it elongated or annular. In a first apparatus of the invention the mold cavity is annular and is formed by a plurality of individual pitches having transverse faces in generally face-to-face abutment in a closed position of the mold cavity. At least several of the pitches are of different circumferential lengths, and in a closed position of the mold cavity the pitches define a predetermined mold configuration which includes portions at angles to the circumference of the article or tire molded in the mold cavity. Most importantly, the mold configuration matches circumferentially across all of the transverse faces of abutting pitches irrespective of the location of the pitches relative to each other and irrespective of the numer of the pitches. Accordingly, irrespective of the manner in which the pitches are located relative to each other or the number and size pitches, an annular article, such as a tire, can be molded of different circumferences/diameters in the same mold, but the same predetermined mold configuration is maintained irrespective of the particular circumference/diameter molded in the mold. Accordingly, the plurality of pitches which collectively define the mold matrix can be increased in number and/or size for larger tires and decreased in number and/or size for smaller tires.

By virtue of a mold matrix constructed from a plurality of pitches which match at each and every abutting face or pitch plane, numerous advantages are achieved, not the least of which is the fact that less costly molds are required by a new tire manufacturer or a retreaded than, for example, if a mold or mold matrix could be used only to manufacture a single sized tire. This is particularly important with belted tires because oversized tires cannot be buffed smaller to fit in smaller molds because the belts would be damaged. Furthermore, smaller belted tires cannot be pressurized and stretched to fit larger molds because the new rubber will not be sufficiently pressurized to form the tread and obtain a proper bond between the new tread and the old tire. In either of the latter two cases the integrity of the tire body can be damaged because the belts can be broken or the bond between the belts and other components of the tire can be weakened.

Another major aspect of the present invention is the fact that the mold opens and closes relative to an associated tire in the absence of tire distortion because tire size and mold size are precisely mated. Thus, tires cannot be damaged during the molding thereof.

In further accordance with this invention, the circumferentialm lengths of the pitches are all relatively short and therefore the abutting faces between adjacent pitches create a relatively large number of opposing abutting pitch surfaces through which air and gas can vent to atmosphere during molding to minimize and eliminate the need for conventional vent holes drilled through conventional matrices. However, if additional venting is required, the pitch faces of the pitches can be scribed, which is accomplished quickly and less expensively by a sawing operation than by drilling conventional matrix vents. Furthermore, the pitches are preferably clamped in groups or segments, and the endmost pitches of each group or segment is provided with a depression or well outside the tread diameter into which the scribe lines will run so that any overflow rubber will flow along the scribe lines, enter the depressions and solidify. This excess rubber can be easily torn from the cured/molded tire eliminating the need for trimming.

Years ago tread designs with variable pitches were introduced on passenger tires to lessen road noise. However, heretofore vairable pitch tread designs did not allow repetitive diameter change without unsightly interruption in tread design except by reconstruction of the mold and/or matrix. In keeping with the present invention, each pitch, irrespective of its circumferential length, matches across the pitch plane of all abutting pitch faces. With the present invention it is immaterial whether one pitch of one circumferential length is substituted for another pitch of a different circumferential length, or different pitches are added or subtracted to alter tire diameter/circumference, because in each case tread configuration matches at all abutting pitch surfaces of faces resulting in an extremely accurately dimensioned tire with an unvarying tread configuration. Such tires have no tread gaps, spaces, blemishes or the like, as might be created by inserting blank shims between a pair of adjacent mold segments, as has been done in the past. Through the utilization of a multiplicity of pitches varying in circumferential size, but all with tread matching at abutting pitch planes or faces, new tires and retread tires of differnt diameters/circumferences can be made economically and rapidly in but a single mold.

With the above, and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 5 is an enlarged fragmentary cross sectional view taken along line 5—5 of FIG. 28 and illustrated details of one of the heaters, and bottom and top side plates of the mold between which are sandwiched a pair of clamps of a clamp assembly holding together the pitches.

FIG. 6 is a cross sectional view taken generally along line 6—6 of FIG. 5, and illustrates a bottom sidewall plate of one of the mold sections in transverse spanning and sliding relationship to an associated arm of the mold table.

FIG. 7 is a cross sectional view taken generally along line 7—7 of FIG. 6, and illustrates further details of a mold segment guide and its associated retaining plate.

FIG. 8 which appears on the sheet of drawing containing FIGS. 16-18, is a cross sectional view taken generally along line 8-8 of FIG. 6, and illustrates details of the bottom sidewall plate, and a cam roller and sidewall wear plate carried thereby.

FIG. 9 is a cross sectional view taken gnerally along line 9—9 of FIG. 7, and illustrates further details of the mold segment guide.

FIG. 10 is a top plan view of one of the heaters of FIG. 4, and illustrates the specifics of the construction thereof.

FIG. 11 is an enlarged cross sectional view taken generally along line 11—11 of FIG. 10, and illustrates a steam chamber defined by walls of the heater.

FIG. 12 is a top plan view of one of the matrix segments, and illustrates six pitches or inserts carried thereby, and a spring cap for maintaining adjacent matrix segments in biased spaced relationship.

FIG. 13 is an enlarged end view taken generally along line 13—13 of FIG. 12, and illustrates opposite clamping bars and a transverse bolt for retaining the segment and pitches in assembled relationship.

FIG. 14 is a cross sectional view taken generally along line 14—14 of FIG. 13, and illustrates one of the spring caps, its associated spring and a housing therefor.

FIG. 15 is an end view of one of the clamping bars of the matrix segment, and illustrates a bore for receiving the cylinder housing of FIG. 14.

FIG. 16 is an end view taken generally along line 16—16 of FIG. 13, and illustrates one of the six pitches or inserts of the matrix segment.

FIG. 17 is an end elevational view taken generally along line 17—17 of FIG. 13, and illustrates the exterior of the pitch or insert of FIG. 16.

FIG. 18 is a diagrammatic enlarged view of one of the four mold sections of FIG. 4, and illustrates three mold or matrix segments thereof, each including six pitches of varying circumferential distances. and two of the sets or groups of pitches being clamped together by an associated clamping assembly, and each clamp carrying a pin for limiting or preventing circumferential sliding motion of the associated matrix segment.

FIG. 23 is a cross sectional view taken generally along lien 23—23 of FIG. 22, and illustrates the manner in which a piston rod retainer plate is secured to a retainer ring and an associated heater of a mold section.

FIG. 24 is a cross sectional view taken generally along lien 24—24 of FIG. 22, and illustrates the manner in which a cylinder retaining plate is secured to a retainer ring and an associated heater of a mold section.

FIG. 25 is an enlarged view of the encircled portion of FIG. 1, and illustrates a mechanism for aligning the tire centering hub of FIG. 3 with the annular mold cavity.

FIG. 26 is a fragmentary side elevational view taken generally along line 26—26 of FIG. 25, and illustrates a mechanism for vertically adjusting the tire centering hub relative to the centering post.

FIG. 27 is a radial sectional view through one of the mold sections, and illustrates a spacer positioned between upper and lower pitches to vary tire tread width.

FIGS. 28, 29 and 31 are top plan views of another mold constructed in accordance with this invention, and illustrates a plurality of pitches or inserts of varying lengths, and illustrates the manner in which all adjacent tread configurations match across pitch planes or abutment planes of all adjacent pitches.

FIG. 30 is a cross sectional view taken generally along line 30—30 of FIG. 29, and illustrates a pair of the adjacent pitches and an insert therebetween.

DESCRIPTION OF THE PREFERRED EMBODIMENT

Figure 1:
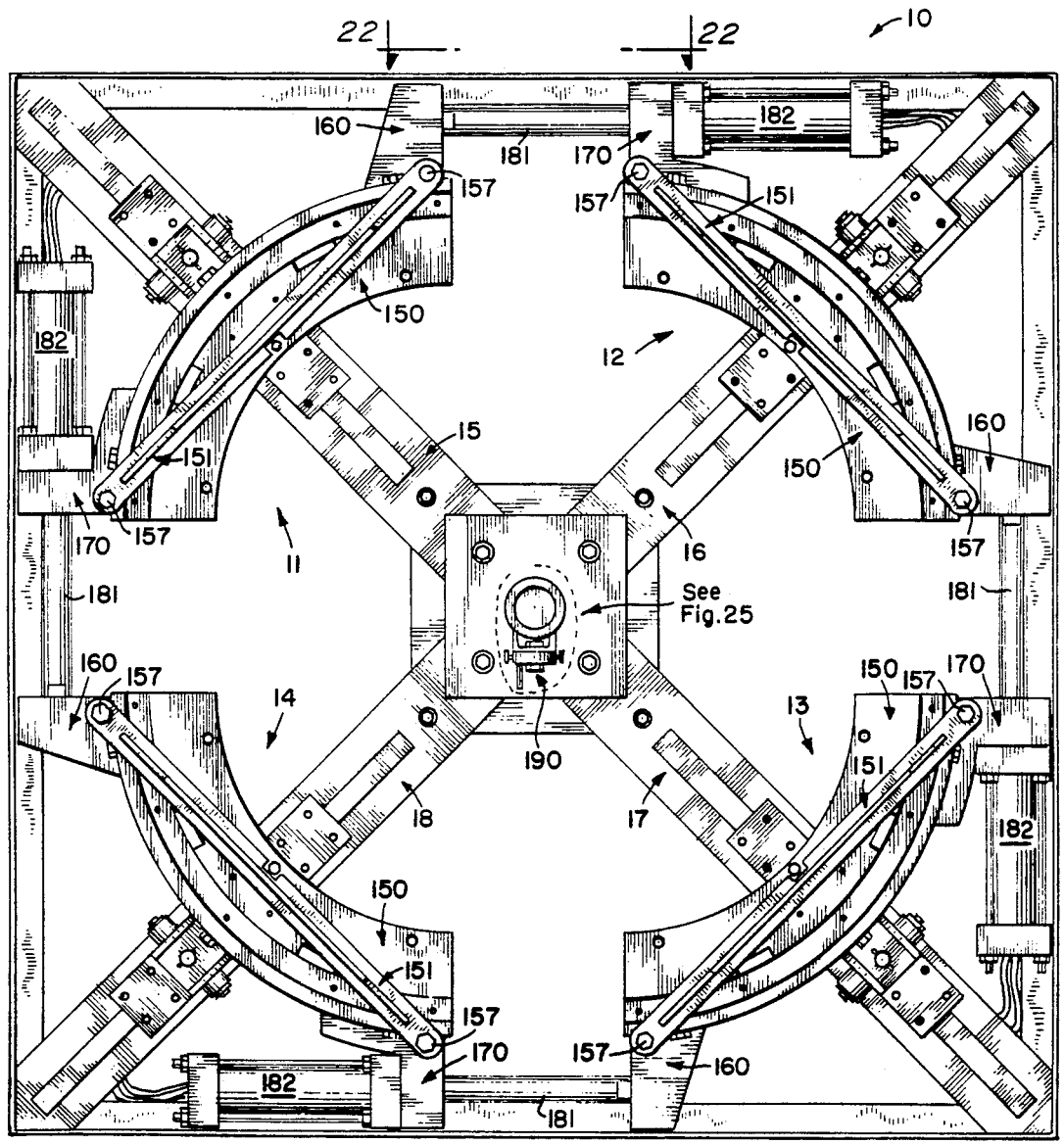
FIG. 1 is a top plan view of a novel mold constructed in accordance with this invention, and illustrates four mold sections in the open position thereof, each slidably carried by an arm of a supporting table with adjacent mold sections being moved between open and closed positions by fluid motors.
Figure 2:
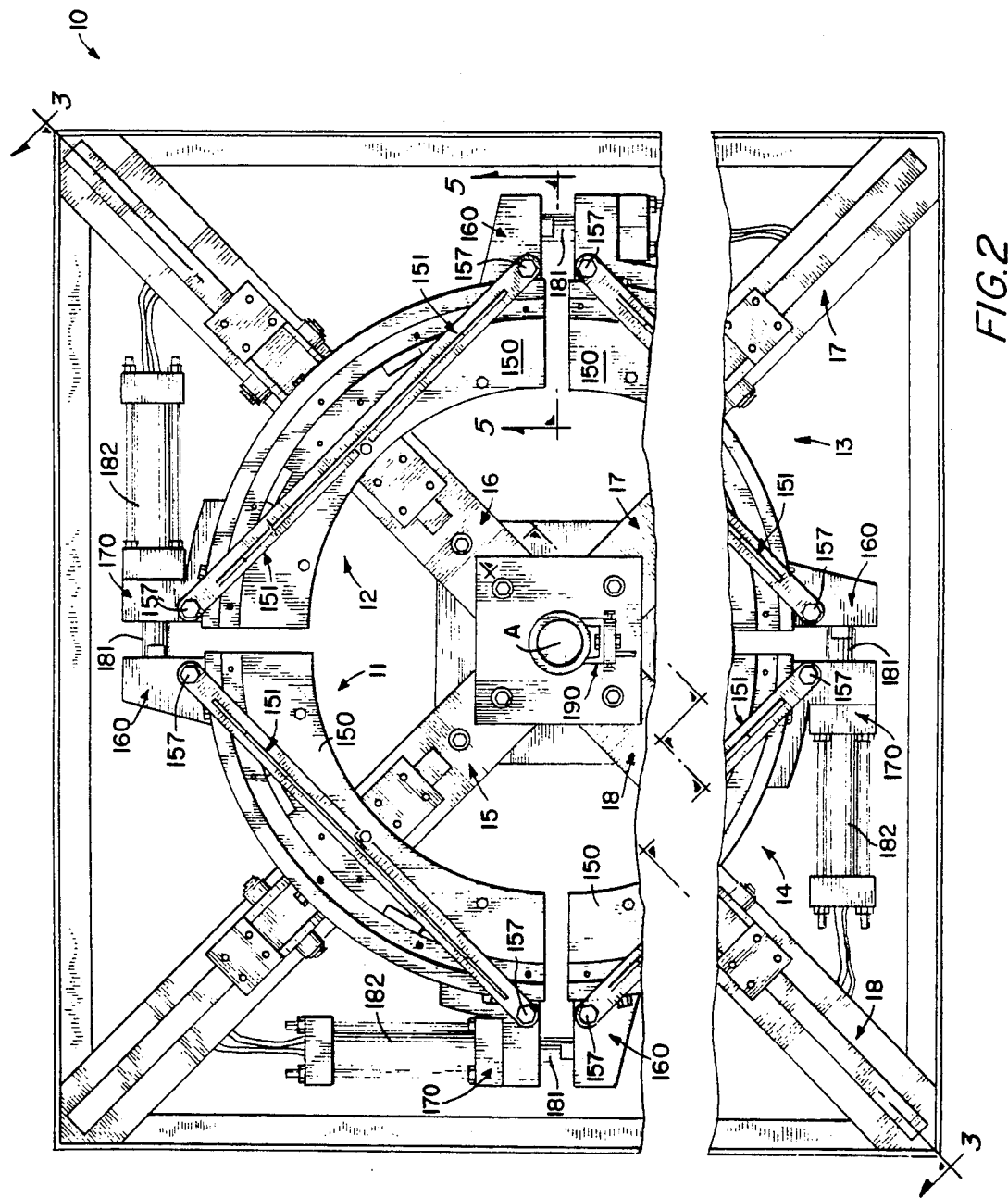
FIG. 2 is a fragmentary top plan view of the mold of FIG. 1, and illustrates the mold sections in their closed positions.
Figure 3:
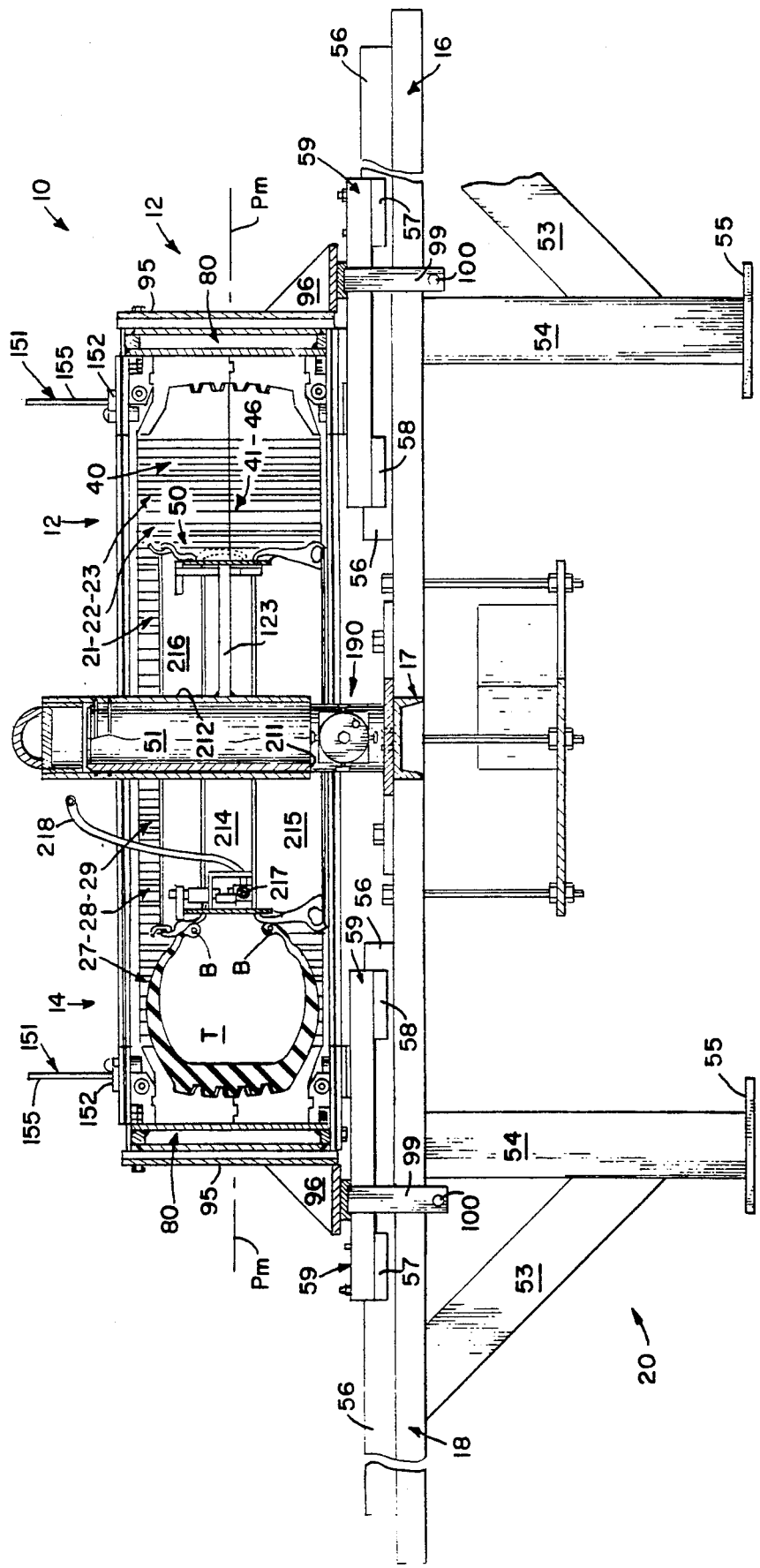
FIG. 3 is a cross sectional view taken generally along line 3—3 of FIG. 2 and illustrates a tire centering hub carried by a centering post of the table and an annular mold chamber formed by a plurality of pitches or inserts in abutting face-to-face relationship along pitch planes thereof.

A novel apparatus, mold or machine constructed in accordance with this invention is generally designated by the reference numeral 10 (FIGS. 1-4), and includes four identical mold sections 11, 12, 13 and 14. The mold sections 11-14 are mounted for reciprocal sliding movement upon respective arms or cross arms 15, 16, 17, and 18 of a table 20 (FIG. 3) between an open position (FIGS. 1 and 4) and a closed position (FIGS. 2 and 3).

Figure 19:
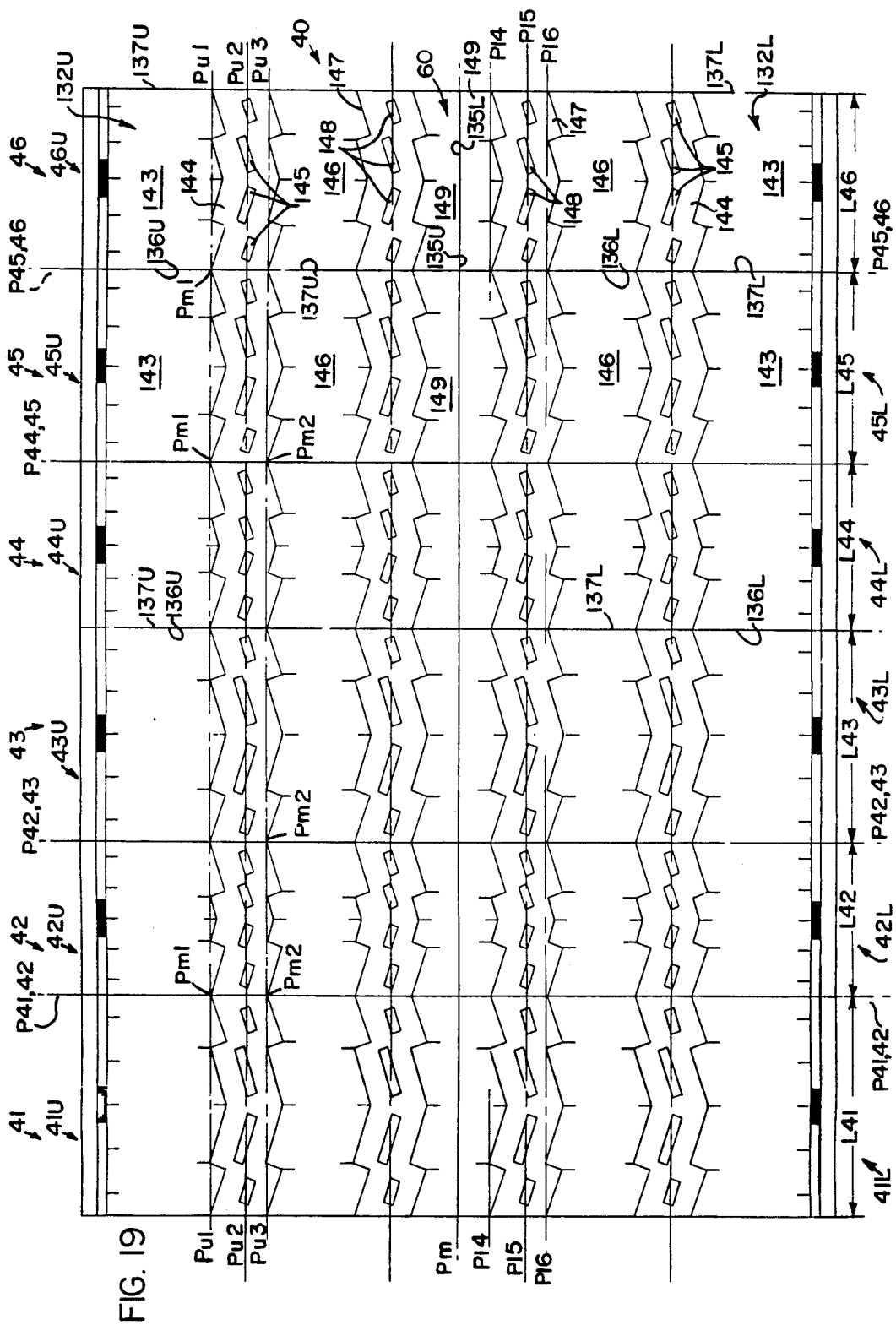
FIG. 19 is an elevational view taken generally along line 19—19 of FIG. 13, and illustrates six pair of pitches with six pitches located on opposite sides of a medial plane taken through the annular mold cavity with all pitches in face-to-face abutment at pitch planes thereof and with the mold configuration matching lengthwise across all of the pitch faces irrespective of the location of the pitches relative to other and irrespective of the number of the pitches per mold segment.
Figure 20:
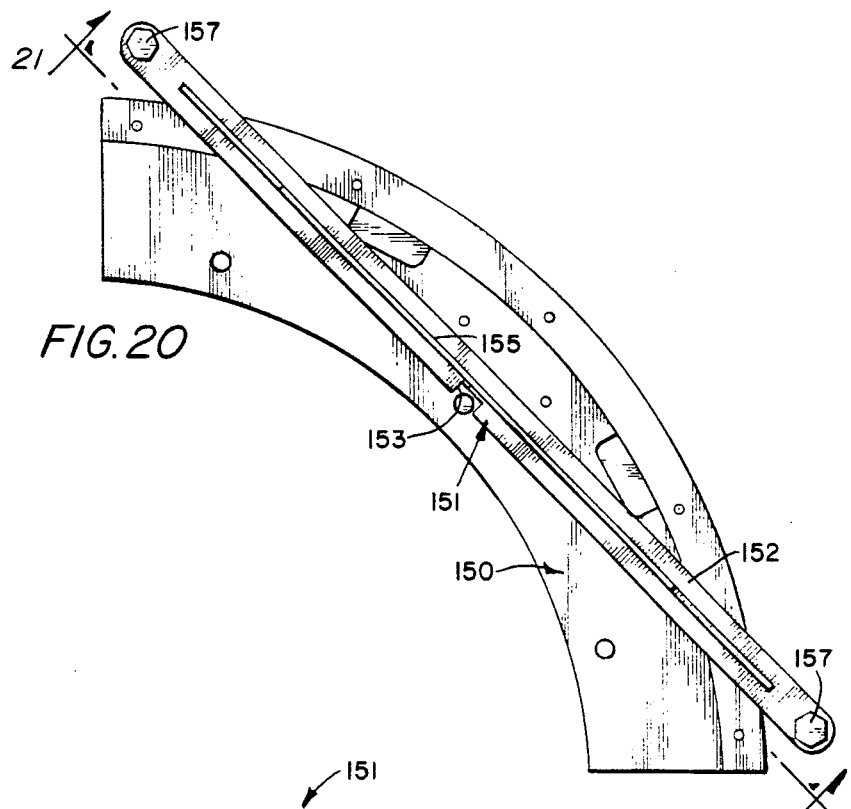
FIG. 20 is a top plan view of one of the four mold sections of FIG. 1, and illustrates one of four top sidewalls and its associated retaining bar and handle.
Figure 21:
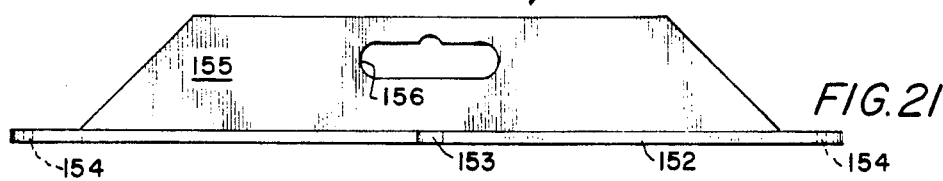
FIG. 21 is a side elevational view taken generally along line 21—21 of FIG. 20, and illustrates details of the retaining bar and handle.

Each mold section 11-14 (FIG. 4) carries three generally identical mold or matrix segments, namely, matrix segements 21-23 carried by the mold section 12, matrix segments 24-26 carried by the mold section 13, matrix segments 27-29 carried by the mold section 14, and matrix segments 30-32 carried by the mold section 15. All matrix segments 21-23 are in generally spaced relationship from each other (FIG. 4) when the mold sections 12-15 are open and are moved circumferentially closer to each other and radially inwardly when the mold sections 12-15 are moved from the open position (FIGS. 4 and 18) to the closed position (FIGS. 2, 3 and 19).

Each of the matrix segments 21-32 carries six pairs of pitches, elements or inserts 41-46 (FIGS. 4, 12, 18 and 19) in which only the pitch pairs 41-46 associated with the matrix segment 22 of the mold section 12 have been individually numbered. However, it is to be understood that the remaining matrix segments 21 and 23-32 each includes six pairs of such pitches 41-46, as will be described more fully hereinafter. Furthermore, the pairs of pitches 41-46 of the matrix segment 22 are rigidly, though releasably, clamped together by a matrix segment clamp or clamping assembly 35, and a like, though unnumbered clamping assembly 35 is associated with the remaining matrix segments 21 and 23-32 to rigidly secure the pairs of pitches 41-46 therein. Accordingly, seventy-two pairs of pitches 41-46 or six pairs of pitches 41-46 per matrix segment 21-32 defines an annular mold or matrix cavity 40, as is best illustrated in FIG. 3 and visualized in FIGS. 1, 2 and 4. It is within the annular matrix or mold cavity 40 that a tire T (FIG. 3) is positioned with its beads B, B aligned by an associated tire aligning or centering hub 50 carried by a hub centering post 51 supported by the table 20. Thus, in the closed position of the mold 10, including the four mold sections 11-14 thereof, the tire 10 is subjected to heat and/or pressure in a conventional manner to mold the tire T, be it a new tire or a retread tire. After the molding operation the mold 10 and specifically the mold sections 11-14 are moved from the closed position (FIG. 2) to the open position (FIGS. 1 and 4) to permit the removal of the tire T therefrom.

The specifics of the mold 10 will now be described particularly with respect to the mold section 12, and this description is equally applicable to the identical mold sections 11, 13 and 14.

The mold section 12 is mounted upon the cross arm 16 of the table 20 for reciprocal sliding movement toward and away from the centering post 51, and the construction thereof will be best understood by reference to FIGS. 3, 5, 6, 7 and 9 of the drawings. The cross arm 16 is a generally inverted U-shaped steel beam 52 which is welded (not shown) to a diagonal brace 53, (FIG. 3) and to a vertical leg 54. The brace 53 and the leg 54 are also welded to each other and the leg 54 is in turn welded to a foot or pad 55 (FIG. 3). A generally square-shaped guide bar 56 of wear-resistant metal is welded to the steel beam 52. A generally inverted U-shaped outer segment guide 57 and a similarly contoured inner segment guide 58, each constructed from wear resistant metal, are in spaced relationship to each other (FIG. 3) and are each in straddled relationship to the guide bar 56. The segment guides 57, 58 are each adjustably connected to a web 61 of an inverted U-shaped guide channel or guide beam 59. Two hexhead bolts and locknuts 62 and two headless set screws and hexhead locknuts 63 secure the segment guides 57, 58 to the web 61 of the guide channel 59. Essentially the set screws and hexhead bolts pass freely through bores (not shown) in the web 61 and are threaded in threaded bores (not shown) of the segment guides 57, 58. With the locknuts loose, the hexhead bolts and headless set screws can be threaded or unthreaded as need be to adjust the planar disposition of the web 61 and all components carried thereby including, of course, the mold section 12. A bushing plate 64, (FIGS. 5 and 7) having an opening (unnumbered) therethrough is welded to the web 61 and a generally rectangular wear plate 65 is also welded or bolted to the web 61 in underlying sliding relationship to a wear plate 66 of a generally rectangular configuration (FIG. 6) bolted to an underside of a generally arcuate bottom sidewall plate 70 which is of a three-ply composite construction, as is best illustrated in FIG. 8. The bottom sidewall plate 70 (FIG. 8) is formed of an arcuate steel plate 71, an arcuate tempered hardboard plate (Masonite) 72 and an arcuate sheet of glass cloth 73 sandwiched between the steel plate 71 and the tempered hardboard plate 72. A plurality of holes 74 (FIG. 6) passed through the bottom sidewall plate and receive hexhead bolts 75 therein. Three other openings (unnumbered) arcuately spaced from each other each receive a hexhead bolt 76 which carries a cam roller 77.

The bolts 75 secure a heater, heater unit or heater assembly 80 against the dense tempered hardboard plate 72 of the bottom sidewall plate 70, as is most readily apparent from FIGS. 5 and 7 of the drawings.

The heater 80 is formed by an inside metallic ring 81 in radially spaced relationship to an outside metallic ring 82 between which are sandwiched and welded an upper metallic band 83 and the lower metallic band 84. Opposite end plates 85, 86 (FIG. 10) are welded to the plates 81-84 and collectively define therewith an arcuate steam chamber 87 having steam inlet/outlet ports 88 at opposite ends thereof for circulating steam in a conventional manner through the steam chamber 87. A plurality of grease fittings 89 are connected to the heater 80 and ports or bores 91 thereof open through an inner circumferential or arcuate surface 90 of the metallic ring 81 to lubricate the same and facilitate circumferential sliding therealong of the matrix segments 21-23, as will be more apparent hereinafter.

A circumferential sheet of insulation 92 is sandwiched between the outside ring 82 of the heater 80 and a circumferential retaining ring 95 to which is welded a pair of identical triangular gusset plates 96 in turn bridged by and welded to a base plate 97 having an opening (unnumbered) aligned with the opening (also unnumbered) of the bushing plater 64. A pivot pin 98 is slidably received in the bore (unnumbered) of the base plate 97, the bore (unnumbered) of the bushing plate 64 and a bore (also unnumbered) in the web 61 of the guide channel 59. In this fashion the entire mold section 12 can pivot about a vertical axis through the pivot pin 90 during open and closing motion of the mold sections 11-14. A pair of plates 99, 99 are welded to the bushing plate 64 and removably receive a pin 100 which prevents the entire mold section 12 from being lifted vertically from the arm 16.

After each of the four heaters or heater sections 80 have been secured by the bolts 75 in upstanding relationship to the bottomside of wall plate 70 of each of the mold sections 12-15, each of the matrix segments 21-32 is assembled by selecting pairs of pitches 41-46 and securing the same together by the clamps or clamp assemblies 35 in a manner which will be most readily apparent with respect to FIGS. 12-19 of the drawings.

Each clamp assembly 35 is formed by a pair of identical mirror image clamp bars, namely, a lower clamp bar 35L and an upper clamp bar 35U. The "L" and "U"

designations are utilized simply to indicate that the clamp bar 35L is positioned most closely adjacent the bottom sidewall plate 70 at the lower side or bottom of the annular matrix cavity 40, as viewed from above in FIG. 5, whereas the clamp bar 35U is the higher or upper clamp bar relative to the matrix cavity 40.

Each of the clamp bars 35L, 35U is of a generally arcuate configuration (FIG. 12) and is set-off by an outer circumferential surface 101, an inner circumferential surface 102, outer peripheral surface 103, an inner peripheral surface 104, and opposite end faces or surfaces 105. Cylindrical bores 106 are formed in each of the clamp bars 35L, 35U and open through one of the end surfaces 105. Circumferential and radial saw cuts 107, 110 open the bore 106 through the surface 102 of each clamp bar 35L, 35U and set-off therebetween clamping legs 108, 109. Socket head cap screws 111 pass freely through openings (FIG. 15) in each of the legs 109 and are received in threaded bores in each of the legs 108 which function to clamp within each bore 106 a spring-biasing mechanism 115 for spacing adjacent matrix segments 21-32 away from each other when the mold sections 12-15 are opened, as will be described more fully hereinafter. The outer peripheral surface 103 of each clamp bar 35L, 35U includes a generally rectangular recess 112 adjacent each end face 105, and a generally elongated through-slot 113 which is located generally centrally of each recess 112. A bolt 114 (FIG. 13) passes through each of the through slots 113 and opposite threaded end portions (unnumbered) receive spacers 115 and threaded nuts 116 for clamping the pairs of pitches 41-46 between the clamp bars 35L, 35U. The inner peripheral surfaces 104 of the clamp bars 35L, 35U also have generally arcuate grooves 117 which open in opposing relationship to each other (FIGS. 5 and 13) and receive therein ribs associated with upper pitches 41L-46L and lower pitches 41U-46U, the pairs of pitches 41-46, as will be described more fully hereinafter.

Each spring-biasing mechanism 115 (FIG. 14) includes a cylindrical housing 121 which houses a compression spring 122 between a retaining slit pin 123 and an enlarged end portion 124 of a spring cap 125 having an end portion 126 projecting outwardly of an opening 127 of the housing 121. Each spring-biasing mechanism 115 is slid into an associated one of the bores 106 after which the socket head cap screws 111 (FIG. 15) are tightened to draw the legs 107, 108 closer to each other and thereby tightly grip the cylindrical housing 121. The cylindrical housing 121 can be clamped within the bore 106 in numerous positions which is dictated by desired spacing between the segments 21-32 which in turn is dictated by the particular diameter/circumference of the tire T which is molded in the mold cavity 40.

One or more radial bores 128 (FIGS. 12 and 18) are formed in the inner circumferential surface 102 and these may be threaded or plain to receive threaded or plain stop pins 129 which cooperate with the cam roller 77 (FIG. 6) of each bottom (and top) sidewall plate 70 to limit circumferential movement of the matrix segments 21-32 relative to their associated mold sections 12-15 or selectively prevent any such circumferential motion, as will be described more fully hereinafter. However, as an example thereafter, in FIGS. 4 and 18 it will be seen that the matrix segments 21, 22 and 23 are in their open position spaced from each other by the projecting end portions 126 of the spring-biasing mechanisms 115 with each outer circumferential surface 101 being in buttting circumferential sliding engagement with the lubricated circumferential surface 90 of the associated heater 80. One stop pin 129 of the matrix segment 21 contacts the left-most cam roller 77 of the mold section 12 which prevents the matrix segment 21 from moving further to the left beyond the position shown in FIGS. 4 and 18 under the influence of the spring-biasing mechanisms 115 between the matrix segments 21, 22. Likewise a stop pin 129 of the matrix segment 23 (FIG. 4) contacts the right-most cam roller 77 of the mold section 12 which prevents the matrix segment 23 from moving further to the right beyond the position illustrated in FIG. 4 under the influence of the spring-biasing mechanisms 115 between the matrix segments 22, 23. Finally, two stop pins 129 (FIGS. 4 and 18) embrace the centermost cam roller 77 of the mold section 12 and essentially prevents circumferential sliding movement of the matrix segment 22 except for extremely limited distances, both to the left and to the right in FIG. 18, in this case under the influence of the spring-biasing mechanisms 115 between the matrix segments 21, 22 and the matrix segments 22, 23. Thus, the matrix segments 21-23 are automatically circumferentially moved away from each other under the influence of the springs 122 (FIG. 14) of the spring-biasing mechanisms 115 when the mold sections 12-15 move from the closed to the open positions thereof.

The pair of pitches 46 will be described with particular reference to FIGS. 13, 16, 17 and 19, and the description thereof is applicable to the pairs of essentially identical pitches 41-45 except for specific circumferential or lengthwise dimensions which differ in a manner to be described more fully hereinafter.

The upper pitch 46U and the lower pitch 46L of the pair of pitches 46 each includes respective outer circumferential surfaces 131U, 131L; each traversed by an outwardly opening U-shaped slot or channel 129U, 129L; respective inner circumferential surfaces 132, 132L; respective outer annular surfaces 133U, 133L; respective inner annular surfaces 134U, 134L; respective medial circumferential abutting surfaces 135U, 135L; and radial plane or pitch plane abutting surfaces 136U, 137U; 136L, 137L. The outer annular surfaces 133U, 133L each includes an arcuate rib 148 which accurately locates in the arcuate groove 117 of the associated clamping bar 35U, 35L (FIG. 13). The medial circumferential abutting surface 135U of the pitch 46U has an arcuate rib 141 which is received in an arcuate groove 142 of the pitch 46L (FIG. 13). The interengaged ribs 148, 141 with the associated grooves 117, 142 assures that the pitches 46U, 46L, as well as the remaining pair of identically constructed pitches 41-45, are accurately maintained in precise relationship when releasably secured together by the clamping bar assembly 35 associated therewith.

The inner circumferential surface 132U, 132L of all of the pairs of pitches 41-46 carried by all of the matrix segments 21-32 collectively define the annular mold or matrix cavity 40 (FIG. 19) and the particular tread configuration or pattern 60 thereof. In FIGS. 13, 16 and 19, the inner circumferential surface 132U is defined by an outermost land 143, an adjacent upstanding zig-zag shaped mold rib 144 having an upper face in which are located four upwardly opening generally rectangular recesses 145, a medial land 146, an inner most zig-zag upstanding mold rib 147 having generally rectangular upwardly opening recesses 148 and an innermost land 149. When the tire T is molded, either as a new tire or a retread tire in the mold cavity 40, the lands 143, 146, 149 of all of the pairs of pitches 41-46 of all of the matrix segments 21-32 define the treads or lugs of the tire T whereas the tire grooves are formed by the mold ribs 144, 147.

An extremely important aspect of the present invention is the manner in which all circumferentially adjacent land 143, 146, 147 and all circumferentially adjacent ribs 144, 147 match across a radial plane or pitch plane (generally P—P of FIG. 19) passing through and/or defined by the abutting radial or pitch abutting surfaces 136U, 136L of one of the pairs of pitches 41-46 which abuts the pitch surfaces 137U, 137L of any of the other pairs of pitches 41-46. In the example of the invention illustrated in FIG. 19, there are five pitch planes P—P, and for ready reference, the pitch planes between the pairs of pitches 41, 42 are designated as the pitch plane P41,42—P41,42; the pitch plane between the pairs of pitches 42, 43 by the pitch plane designation P42,43—P42,43, etc. Since the pitch plane abutting surfaces 136U, 136L; 137U, 137L are not parallel (see FIGS. 12, 16, 17 and 18), the various pitch planes P41,42-P41,42 through P45,46—P45,46 are not parallel to each other but they generally merge at an axis A (FIGS. 4 and 18) of the matrix cavity 40 when the mold sections 12-15 are closed. Three parallel circumferential planes (FIG. 19) which are normal to the axis A of the matrix cavity 40 are designated as the planes Pu1—Pu1; Pu2—Pu2; and Pu3—Pu3. The planes Pu1—Pu1 and Pu3—Pu3 are shown intersecting each of the pitch planes P41,42—P41,42 through P45,46—P45,46 at the matching points or lines of contact Pm1 of one side of the mold ribs 44 while the plane Pu3—Pu3 likewise passes through like matching points/lines of contact Pm2 at the lower side of the mold ribs 144, as viewed in FIG. 9. The plane Pu2—Pu2 passes generally symetrically through all of the upwardly opening rectangular recesses 145, and these planes Pu1—Pu1 through Pu3—Pu3 evidence the manner in which irrespective of the irregular or angular nature of the mold ribs 144, all pitches 41U-46U match at each of the pitch planes P41,42—P41,42 through P45,46—P45,46, and this matching across these pitch planes occurs not only when the pairs of pitches 41-46 are positioned in the exact adjacent relationship as shown in FIG. 19, but also if any of these pitches are reoriented relative to each other or exchanged for a different pitch, as will be more apparent hereinafter. Furthermore, this interchangeability is significant because each pitch 41U, 41L through 46U, 46L of each pair of pitches 41-46 is of a different circumferential length (generally L in FIG. 19) as measured normal to and between the pitch surfaces 136U, 137U of the pitches 41U-46U and 136L, 137L of the pitches 41L-46L with the specific distances being respectively designated as L41-L46. The manner in which the pairs of pitches 41-46 are selected and associated with the various matrix segments 21-32 to mold tires T of different diameters/circumferences within the mold 10 will be described subsequently herein.

Figure 22:
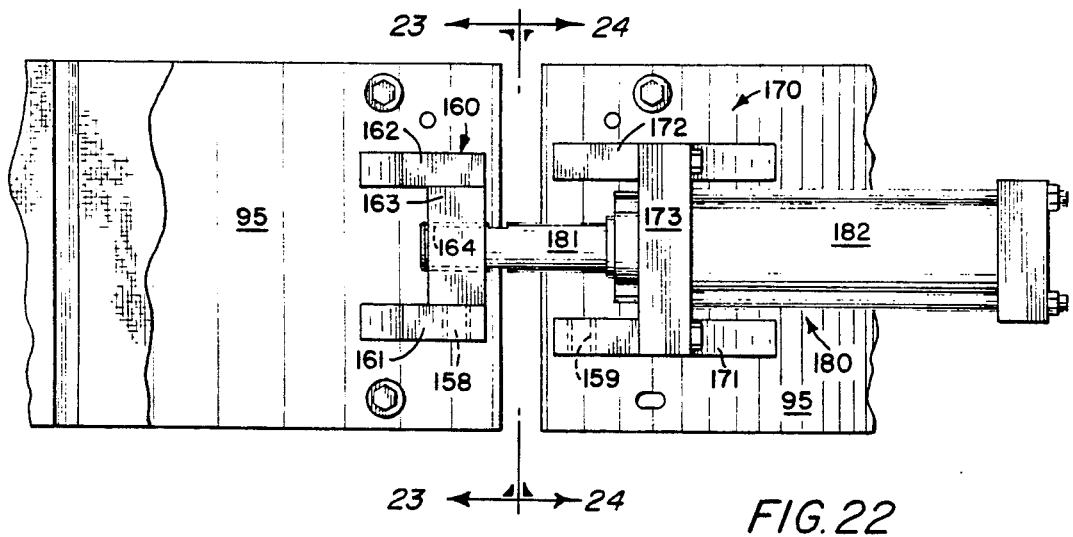
FIG. 22 is an enlarged fragmentary view taken generally along line 22—22 of FIG. 1, and illustrates a fluid motor cylinder connected to one mold section and its associated piston rod connected to an adjacent mold section.

After the matrix segments 21-23, 24-26, 27-29 and 31-32 have been clamped together by the clamping assemblies 35 and placed in the respective mold sections 12-15 (FIG. 4), each mold section 21-32 is closed by a top sidewall plate 150 which is of a construction generally identical to the bottom sidewall plate 70, and therefore identical, though primed, reference numerals have been applied thereto. As is best illustrated in FIG. 1, after each of the top sidewall plates 150 has been positioned above the matrix segments associated with each mold section 12-15, each top sidewall plate 150 is fastened to its associated mold section 12-15 by a retaining bar 151 (FIGS. 1, 5, 20 and 21) defined by a base plate 152 having a central notch 153 and axially opposite openings 154. A handle plate 155 having a hand grip and hoist hook engaging opening 156 is welded to the base plate 152. Bolts 157 pass through the openings 154 and are threaded into threaded bores 158, 159 (FIGS. 23 and 24, respectively) of respective piston rod retainer brackets 160 and fluid cylinder retainer brackets 170 carried one each at circumferentially opposite ends of each retaining ring 95 by being welded thereto. Each piston rod retainer bracket 160 includes a pair of side plates 161, 162 (FIGS. 22 and 23) bridged by a face plate 163 welded thereto and having a threaded bore 164. Each of the side plates 161 has one of the threaded bores 158 formed therein to receive one of the bolts 157. The threaded bore 164 threadly receives a threaded end portion (unnumbered) of a fluid motor piston rod 181 of a fluid motor cylinder 182 of a fluid motor 180 carried by each of the fluid cylinder retaining brackets 170. Each fluid cylinder retaining bracket 170 includes side plates 171, 172 and a face plate 173 secured therebetween to which is connected the fluid motor cylinder 182. The side plates 171 of each fluid cylinder retaining bracket 170 includes one of the threaded bores 159 (FIGS. 22 and 24) for receiving one of the bolts 157. Fluid in the form of liquid or gas from an appropriate source is controllably delivered to the cylinders 182 and exhausted therefrom through appropriate regulating valves to simultaneously move the mold sections 11-14 from the open (FIGS. 1 and 4) to the closed (FIGS. 2 and 3) positions and vice versa during which time the mold sections 11-14 slide along the respective cross arms 15-18.

The tire T must be accurately centered relative to the matrix cavity 40, particularly if the matrix cavity 40 is increased in width in a manner to be described more fully hereinafter. However, irrespective of such increase in matrix cavity width, means generally designated by the reference numeral 190 (FIGS. 3, 25 and 26) is associated with the hub centering post 51 and the tire centering hub 50 (FIG. 3) to achieve accurate location of the tire T within the matrix cavity 40, namely, a medial plane through the tire T is coincident to the medial plane Pm (FIGS. 5 and 19). The tire centering-/aligning mechanism 190 includes a mounting channel 191 having legs 192, 193 welded to the hub centering post 51. A web 194 has a central opening (unnumbered) which matches an opening (not shown) in the center of a circular rotatable selector disk 195 having a handle 196 and a plurality of bolts 201-204 threaded into threaded bores (not shown) of a periphery of the disk 195. A spring-biased ball detent locking mechanism 205 is carried by the web 194 and its ball (unnumbered) can selectively mate with a plurality of recesses 206 of the disk 205. The heads of the bolts 201-204 project different distances away from the peripheral surface (unnumbered) of the disk 195 and, if required, can be threaded or unthreaded for further minor adjustment. An individual one of the bolts 201-204 can be positioned at the twelve o'clock position shown in FIGS. 3 and 26 which in FIG. 26 is occupied by the bolt 201. An edge 211 of a hub supporting tube 212 of the tire centering hub 50 (FIG. 3) rests upon whichever of the bolts 201-204 is at the twelve o'clock position. Thus, by rotating the disk 195 and placing any one of the bolts 201-204 in the twelve o'clock position (FIGS. 3 and 26) the edge 211 of the hub supporting tube 212 can be selectively elevated or lowered to accurately support the tire centering hub 50 in such a manner that a center plane through the tire T corresponds to the plane Pm of the matrix cavity 40, as shown in FIG. 3.

The hub supporting tube 212 is connected by a plurality of radial ribs or spiders 213 (FIG. 13) to a central cylindrical sleeve 214. A bottom rim half 215 is welded to the central sleeve 214 while an upper rim half 216 is removably and adjustably secured to the central rim portion 214. A normally closed valve 217 is connected to a line 218 which is placed in fluid communication with a suitable source of compressed air. The tire T, after being buffed and built-up, is placed over the bottom rim half 215 which forms an airtight seal with the bottom tire bead B and the top rim half 216 is then placed over the cylindrical rim portion 214 and conventionally locked thereto which automatically opens the valve 217 and pressurizes the interior of the tire T. The matrix cavity 40 is closed by the rods 181 being retracted into the cylinders 182 drawing the mold sections 12-15 circumferentially toward each other which also slides the mold sections 12-15 radially inwardly along the respective arms 15 through 18, as is readily apparent from FIGS. 1 and 2. Moreover, the circumferential closing of the mold sections 12-15 slides the matrix segments 21-32 relatively circumferentially against the bias of the springs 122 of the mechanisms 115 until all pitch surfaces 136U, 136L and/or 137U, 137L of all endmost pairs of pitches 41-47 of all segments 21-32 are brought into intimate abutting relationship to close the matrix cavity 40. After a predetermined time period the sections 21-32 are opened, the entire tire centering hub 50 and the tire T is lifted from the mold by a hoist or the like, the hub 50 is disassembled and the process is repeated.

OPERATION

It will be assumed for the purposes of the description of the operation of the mold 10 that the annular mold or matrix cavity 40 has been made to a median matrix tread diameter of 42¼" which is a circumference of approximately 132.732" requiring 33.1830" of mold cavity circumference per each mold section 11-14 which in turn is 11.061" per each matrix segment 21-32. The pitch lengths L41-L46 are respectively 2.2853", 1.4999", 2.0889", 1.5981", 1.8926", and 1.6962" or a total of 11.061". Therefore, by assembling the pitches 41-46 of FIG. 19 to form the matrix segment 22 in the manner described and identically placing identical pairs of pitches 41-46 in the remaining matrix segments 21 and 23-32, the twelve segments multiplied by 11.061" per segment equals the circumference of 132.732" and, of course, the latter divided by $\pi$ equal a tread diameter of 42.2499 or 42¼" diameter.

While the pitches 41-46 of all matrix segments 21-32 have been described in the last example as being arranged in the numerically consecutive order of 41-46, as shown in FIG. 19, these pitches can be arranged in different sequences in each matrix segment. For example, in FIG. 19 the pairs of pitches could be arranged in any sequence, such as 41, 43, 42, 44, 46, 45; 41, 42, 43, 45, 46, 44; 43, 42, 41, 46, 45, 44, etc. No matter the sequence of the pitches 41-46, the length or circumference of any sequence of pitch lengths L41-L46 remains the same, namely, 11.061". Furthermore, no matter the sequence of the pitches, all abut at the pitch planes (generally P—P) and the tread patterns at all the pitch planes P—P are perfectly matched circumferentially, as is visually evident from FIG. 19, particularly relative to the planes Pu1—Pu1, Pu2—Pu2, PL4—PL4, etc.

Figure 4:
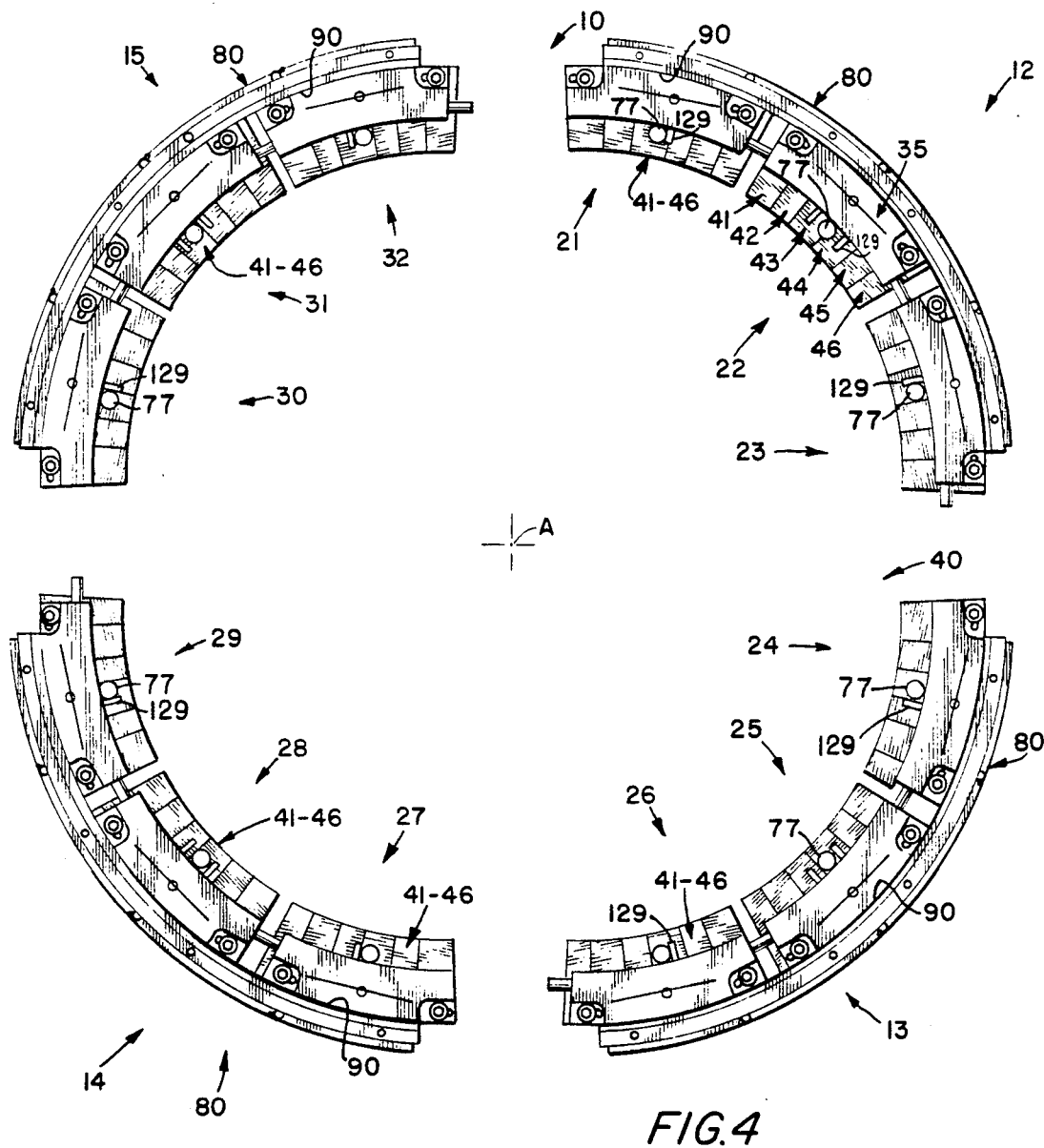
FIG. 4 is a schematic top plan view of the mold of FIGS. 1 and 2 with parts removed for clarity and illustrates a heat chamber and three mold segments associated with each of the four mold sections and six pitches carried by each mold segment.

It will now be assumed that the mold 10 is to be converted from the 42¼" tire diameter matrix 40 to a larger tire diameter matrix, for example, a tire diameter of 42¾". Obviously the bolts 157 are removed and each top sidewall plate 150 is also removed to expose the interior of each of the mold sections 12-15 and the segments 21-32 thereof, as is shown in FIG. 4. In order to reduce mold conversion time and associated downtime, it is obviously preferable to alter as few of the matrix segments 21-32 and the pairs of pitches 41-46 thereof, as is possible when converting from the 42¼" diameter matrix to the 42¾" matrix. With this in mind it is preferable to change only one matrix per mold section. Accordingly, it will be assumed that only one matrix segment 21-32 will be removed from each mold section 12-15, and also preferably an end matrix segment of each mold section is preferably removed because of ease and convenience. Accordingly, the matrix segments 22, 23 will remain in the mold section 12 and only the matrix segment 21 will be removed. Similarly, the matrix segments 24, 27 and 30 will be removed from the respective mold sections 13, 14 and 15 while the matrix segments 25, 26; 28, 29; and 31, 32 will remain in the respective mold sections 13, 14 and 15. Therefore, retained in the mold 40 and left unaltered are eight mold sections each having the earlier noted total length of 11.061" or a total of 88.488".

Each of the removed matrix segments 21, 24, 27 and 30 will necessarily have the clamp assemblies 35 loosened by appropriately unthreading the nuts 116 associated with the bolts 114. The pair of pitches 42 will be removed from the sequence of pitches 41-46 (FIG. 19) and substituted therefor is another pair of pitches 45. Therefore, the pairs of pitches in each of the matrix segments 21, 24, 27 and 30 are 41, 45, 43, 44, 45, and 46. Thus in each of the matrix segments 21, 24, 27 and 30, there are no longer a pair of pitches 42, and instead there are a pair of pitches 45 and the pitches 41, 43, 44 and 46. The total length of each segment 21, 24, 27, 30 is therefore the total of the lengths L41, L45, L43, L44, L45, and L46 which equals 11.4537" per matrix segment or a total of 45.8148". Adding 88.488" and 45.8148", the total is 134.3028" circumference which when divided by $\pi$ is a tire diameter of 42.7499" or 42¾" diameter. Obviously, the nuts 116 are tightened, the matrix segments 21, 24, 27 and 30 are repositioned as shown in FIG. 4, and a molding, new tire treading or retreading operation can take place for a 42¾" diameter tire in, of course, the same mold 10. Furthermore, since the thread configuration 60 of the pitches 41-46 match across the pitch planes P—P, the pair of pitches 45 substituted for the pair of pitches 42 and sandwiched between the pairs of pitches 41, 43 match perfectly with the latter.

If it is desired to mold, tread or retread a tire of a diameter smaller than the original 42¼", this can be readily accomplished by again selectively changing the pitches 41-46. In this case it will be assumed that the mold 10 has the same pitches 41-46 as described for the 42¼" diameter matrix, namely, twelve identical pitches each totalling 11.061". Just as in the case of the 42¾" diameter tire, it will also be assumed that eight matrix segments 22, 23; 25, 26; 28, 29 and 31, 32 will not be changed thus retaining a total circumferential matrix length of 88.488". The four matrix segments 21, 24, 27 and 30 are again removed, the clamp assemblies 35 loosened, and in each segment 21, 24, 27 and 30 the pairs of pitches 43, including the upper pitch 43U and the lower pitch 43L, are removed and substituted for by a pair of pitches 46 resulting in a sequence of pitches of 41, 42, 46, 44, 45 and 46 for each of the four segments 21, 24, 27 and 30. The lengths of each segment following this substitution is the total of L41, L42, L46, L44, L45 and L46 or a total of 10.683" per matrix segment and 42.6732" for the four matrix segments 21, 24, 27 and 30. The total of 88.488" and 42.6732" is 131.1612" circumference which when divided by $\pi$ is 41.7499" or 41¾" tire diameter.

It is again emphasized that though the tire circumference and diameter has again been changed, the tread pattern or configuration 60 matches across all pitches at each pitch plane P—P. The latter also applies irrespective of the sequence of the pitches, as was earlier noted. In other words, in the last example the pair of pitches 43 was removed and replaced or substituted for by another pair of pitches 46. Thus the sequence of the pitches became 41, 42, 46, 44, 45 and 46. However, the sequence could as well be 41, 46, 42, 44, 45, 46; etc. Again, no matter the sequence of the selected pitches, all tread configurations of the tread pattern 60 match across the pitch planes P—P of adjacent pitches 41–46.

Though three examples have been given exemplary of the invention, these should not be considered limiting since numerous different diametered tires can be molded by selecting appropriate pitches 41–46. Table I lists hereafter diameters increasing and decreasing in ⅛" increments from the median mold diameter of 42¼" diameter which allows new tires or retread tires in the range of 41–43½" to be molded in the mold 10.

TABLE I

MOLD CAVITY/TIRE DIAMETERS ATTAINABLE IN MEDIAN 42¼" MATRIX

|  | DIAMETER (INCHES) | CIRCUMFERENCE (INCHES) |
|---|---|---|
| MAXIMUM | 43.5 | 136.659 |
|  | 43.375 | 136.266 |
|  | 43.25 | 135.874 |

TABLE I-continued

MOLD CAVITY/TIRE DIAMETERS ATTAINABLE IN MEDIAN 42¼" MATRIX

|  | DIAMETER (INCHES) | CIRCUMFERENCE (INCHES) |
|---|---|---|
|  | 43.125 | 135.481 |
|  | 43 | 135.088 |
|  | 42.875 | 134.696 |
|  | 42.75 | 134.303 |
|  | 42.625 | 133.910 |
|  | 42.5 | 133.518 |
|  | 42.375 | 133.125 |
| MEDIAN | 42.25 | 132.732 |
|  | 42.125 | 132.229 |
|  | 42 | 131.947 |
|  | 41.875 | 131.554 |
|  | 41.75 | 131.161 |
|  | 41.625 | 130.768 |
|  | 41.5 | 130.376 |
|  | 41.375 | 129.983 |
|  | 41.25 | 129.590 |
|  | 41.125 | 129.198 |
| MINIMUM | 41 | 128.805 |

Table II is exemplary of common tires falling in the 41" to 43½" diameters.

TABLE II

| SIZE | TYPE | PR | DIAMETER TIRE AT 16/32 | MOLD | CS | TREAD WIDTH TIRE | MOLD |
|---|---|---|---|---|---|---|---|
| TREAD DIAMETERS FROM 41" TO 41⅞" |||||||||
| 11R22.5 | X | 14 | 41–41⅞ | 41¼ | 10.6–11.5 | 7.6–8.5 | 8⅛ |
| 11R22.5 | X | 16 | 41¼–41½ | 41¼ | 10.6–11.2 | 7.4–8.7 | 8⅛ |
| 275/80R24.5 | PX | 14 | 41–41¼ | 41¼ | 10.7–11 | 7.7–8.5 | 8⅛ |
| 10R22.5 | X | 14 | 41⅛–41½ | 41¼ | 10.6–11.1 | 7.6–8.5 | 7½–8⅛ |
| 10R22.5 | X | 16 | 41¼–41½ | 41¼ | 10.6–11.3 | 7.4–8.7 | 7½–8⅛ |
| 10.00R20 | X | 14 | 41⅛–41½ | 41¼ | 10.7–10.9 | 7.2–8 | 7½–8⅛ |
| 10.00R20 | X | 16 | 41¼–41½ | 41¼ | 10.7–11.8 | 7.1–8.7 | 7½–8⅛ |
| 295/80R22.5 | PX | 16 | 41⅞ | 41½ | 11.7 | 8.5 | 8⅛ |
| TREAD DIAMETERS FROM 42¼" TO 42¾" |||||||||
| 11.00R20 | X | 14 | 42½ | 42½ | 11–11.4 | 7.7–8.1 | 7½–8⅛ |
| 11.00R20 | X | 16 | 42½ | 42¾ | 11–12 | 7.7–9.2 | 8⅛ |
| 10.00R22 | X | 14 | 42¼–42⅝ | 42¾ | 10.6 | 7.9 | 7½–8⅛ |
| 12R22.5 | X | 16 | 42¼–42⅝ | 42¾ | 11.2–11.3 | 7.6–8 | 7½–8⅛ |
| TREAD DIAMETERS FROM 43¼" TO 43½" |||||||||
| 10.00R22 | X | 12 | 43¼–43⅝ | 43¼ | 10.7–10.9 | 7.4–7.9 | 7½ |
| 10.00R22 | X | 14 | 43¼–43⅝ | 43¼ | 10.6–11.3 | 7.4–8.7 | 7½–8⅛ |
| 11R24.5 | X | 14 | 43⅛–43⅝ | 43¼ | 10.9–11.1 | 7.6–8.5 | 7½–8⅛ |
| 11R24.5 | X | 16 | 43⅜–43½ | 43½ | 10.7–11.1 | 7.6–8.7 | 7½–8⅛ |

The mold 10 is also capable of molding new or retread tires of varying tread widths, including tread widths beyond those listed in Table II. In order to do so, one or more circumferential pitch inserts 250 (FIG. 27) are provided which have spaced generally parallel circumferential surfaces (unnumbered) provided with an arcuate groove 251 and an arcuate rib 252 which mate with the respect ribs 141 and grooves 142 of the pairs of pitches 41–46 and specifically the upper pitches 41U–46U and the lower pitches 41L–46L. An inner circumferential surface 253 of the pitches 250 has a tread configuration corresponding to that of the tread configuration 60, and preferably all the pitches 250 have parting planes P—P and dimensions corresponding to and mating with those of the pairs of pitches 41–46. The latter results in the pitch inserts 250 matching across all pitch planes, particularly radial pitch planes corresponding to the pitch planes P—P of FIG. 19. By utilizing such pitch inserts 250 tires can be molded or retreaded having appreciably wider tread widths, as represented in Table III listed hereafter.

TABLE III

| | | | PITCH INSERT(S) FOR WIDE TREADS | | | | |
| | | | DIAMETER | | | DIAMETER | SPACER |
| TIRE SIZE | TYPE | PR | TIRE | MOLD | CS | TIRE | MOLD | WIDTH |
| --- | --- | --- | --- | --- | --- | --- | --- | --- |
| 13.80R20 | PX | 18 | 41 | 41 | 12.6 | 9.8 | 9¼ | 2" |
| 315/80R22.5 | PX | 18 | 42⅞ | 42½ | 12.4 | 9 | 9 | 1½" |
| 315/80R22.5 | PX | 20 | 42¼ | 42¼ | 12.4 | 9.3 | 9 | 1½" |
| 385/65R22.5 | X | 18 | 42 | 42 | 14.9 | 11.1 | 11 | 3½" |

Figure 29:
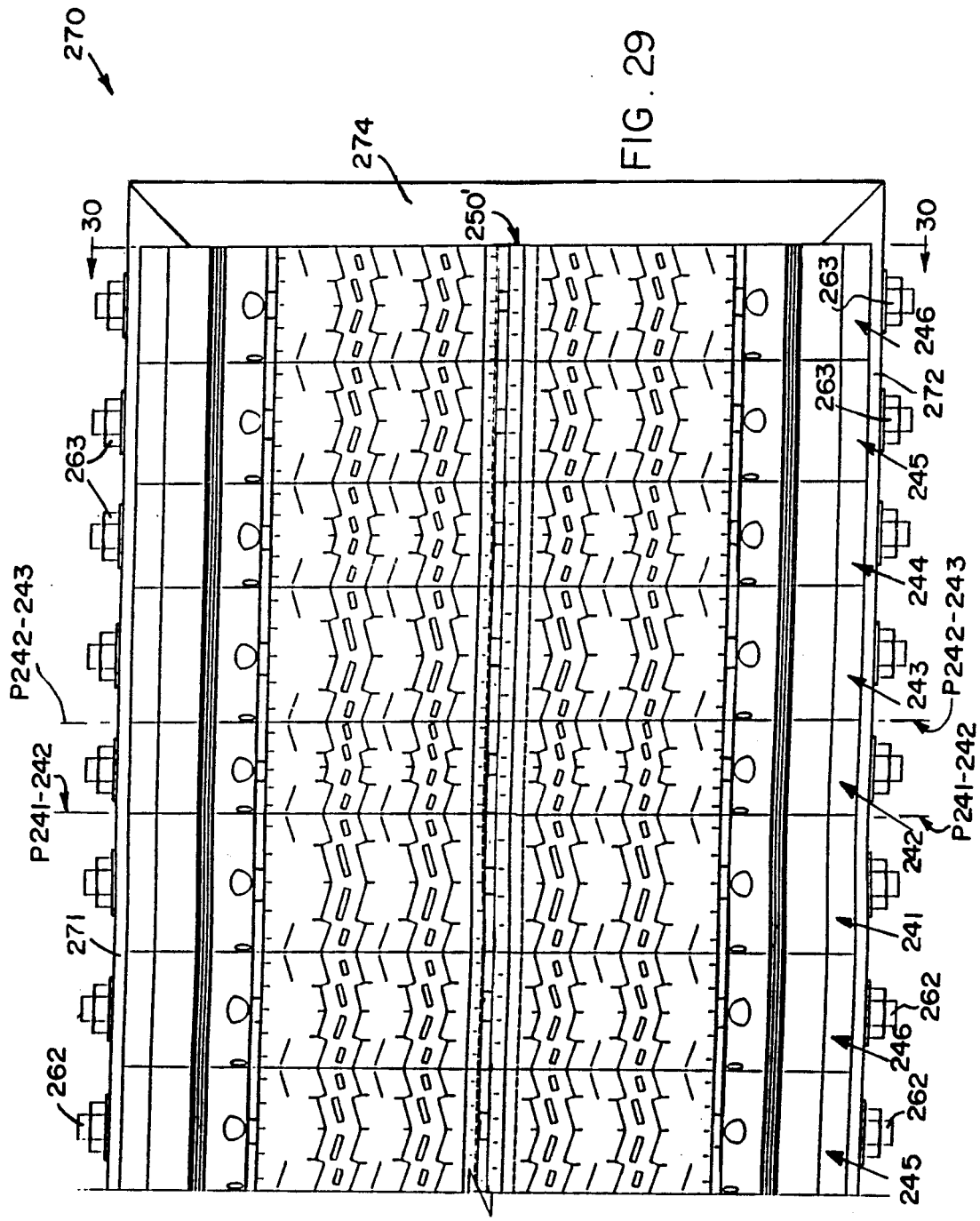

Though the invention has been thus far described relative to an annular mold or molding machine 10, the invention is equally applicable to a relatively long and flat mold, as is generally designated by reference numeral 270 in FIGS. 28–30. In this case the mold 270 includes opposite generally parallel longitudinal walls 271, 272 and opposite shorter end walls 273, 274 rigidly interconnected in surrounding confining relationship to pairs of pitches 241-246 which are essentially identical in construction to the pitches 41-46, respectively, including the matching of the tread configuration or profile 260 across the individual pitch planes P241, 242-P241, 142; P242, 243-P242, etc. Furthermore, a pitch insert 250' (which is not used for narrower treads) is sandwiched between the pairs of pitches 241-246 and locked thereto by bolts and nuts 262, 263 in the manner clearly apparent from FIG. 30 of the drawings. The mold 270 is heated by steam heaters 280, 281, the lower one of which is bolted to the walls 271-272 and the upper one of which is removably secured to the same walls to form a generally uniplanar length of rubber, specifically "precure," which after molding is removed from the mold 270, transversely cut into desired lengths, and applied to the circumference of buffed tires. Heretofore when such precure was made in long lengths and cut into shorter lengths, the splices did not match even with stretching or crowding the rubber, except rarely by happenstance, and therefore tires were unsightly and were difficult to balance. However, in keeping with the present invention, a relatively long length of precure can be formed in the mold 270, transversely severed along any one of the parting pitch planes (generally) P—P, and all splices, irrespective of the length, would match.

As an example, it will be assumed that a length of precure is to be molded in the mold 270 sufficient to apply a tread to each of three tires with the tires varying in diameter from 41" to 43½" which, of course, reflects a difference in length of approximately 2½". The mold 270 is primed in FIG. 31 to designate changes in mold length and pitch organization/juxtaposition as compared to the mold 270 of FIGS. 28–30. However, the pitches 241-246 are assembled in the mold 270' in abutting relationship and clamped therein by the bolts 262 and nuts 263 as in the manner heretofore described. The major difference between the mold 270 and the mold 270' is the fact that mold 270' has a mold or matrix cavity 260' having an overall length of 407.19". The length of 407.19" is selected because one-third thereof, minus one or more pitches, as necessary, will produce three pieces of precure (hereinafter precure segments) each of which will generally "fit" an associated tire circumference in the diameter range from 41" to 43½" with either no stretch or minumum stretch. (Precure tread can be stretched a minimum of one inch around a tire circumference, and therefore it is not necessary for the matrix cavity 206' to be exactly three times the circumference of the three tires which are to be retreaded from the three precure segments cut from the single length of precure molded in the matrix cavity 260'.)

Turning specifically to FIG. 31, the mold 270' is fully illustrated and includes a cavity 260' which is 407.19" in length, as aforesaid, and includes three identical sections 301, 302 and 303. The entire mold cavity 260' is formed of thirty-six segments 501-536 or twelve segments per each section 301, 302 and 303. The section 301 is formed of the segments 501-512, the section 302 is formed of the segments 513-524 and the section 303 is formed of the segments 525-536. The total length of each section 301, 302 and 303 is identical, namely 135.73" (⅓ of 407.19") which is accomplished by selectively assembling and juxtapositioning the pitches 241-246.

Each of the segments 501-511; 513-523 and 525-535 of the respective sections 301, 302 and 303 is of identical lengths and each is formed of the pitches 241, 246, 244, 245, 243 and 242 in this exact order from left-to-right in FIG. 31. The pitch 241 is 2.2853", the pitch 246 is 1.6962", the pitch 244 is 1.5981", the pitch 245 is 1.8926", the pitch 243 is 2.0889" and the pitch 242 is 1.4999". The total length of these six pitches is 11.061" which multiplied by eleven segments is 121.67". Accordingly, the total length of each of the segments 501-511; 513-523 and 525-535 is 121.67".

The final segment 512, 524 and 536 of each respective section 301-303 is also of an identical length and is formed by the pitches 243, 246, 244, 243, 246, 245, 242 and 242 in exactly that order from left-to-right in FIG. 31. (However, for purposes of describing the method of cutting the mold precure into three precure segments, the last two pitches of the segments 512, 524 and 536 have been numbered 242a, 242b; 242c, 242d; and 242e, 242f, respectively. Therefore, the total length of each segment 512, 524 and 536 is 14.06". Each segment 301, 302 and 306 therefore totals 121.67" (eleven segments) plus 14.06" (one segment) or a total of 135.73" which when multiplied by the three sections 301-303 is a total length of 407.19".

TABLE IV

| | SINGLE PRECURE MOLD LENGTH FOR RETREADING THREE TIRES OF DIFFERENT DIAMETERS/CIRCUMFERENCES | | | | |
| TIRE DIAMETER | TIRE CIRCUMFERENCE | PRECURE LENGTH | PRECURE SEGMENT LENGTH | PITCH PLANES/ PRECURE CUT PLANES | PRECURE SEGMENT STRETCH |
| --- | --- | --- | --- | --- | --- |
| 43½" | 136.66" | 407.19" | 135.73" | 242b of segment 512<br>242d of segment 524 | 0.93" |
| 43¼" | 135.87" | 407.19" | 135.73" | 242b of segment 512<br>242d of segment 524 | 0.144" |

TABLE IV-continued

SINGLE PRECURE MOLD LENGTH FOR RETREADING
THREE TIRES OF DIFFERENT DIAMETERS/CIRCUMFERENCES

| TIRE DIAMETER | TIRE CIRCUMFERENCE | PRECURE LENGTH | PRECURE SEGMENT LENGTH | PITCH PLANES/ PRECURE CUT PLANES | PRECURE SEGMENT STRETCH |
|---|---|---|---|---|---|
| 42¾″ | 134.3″ | 407.19″ | 134.23″ | 242a/242b of segment 512<br>242c/242d of segment 524<br>242e/242f of segment 536 | 0.069″ |
| 42¼″ | 132.73″ | 407.19″ | 132.73″ | 245/242a of segment 512<br>245/242c of segment 524<br>245/242e of segment 536 | 0.0 |
| 41½″ | 130.37″ | 407.19″ | 130.24″ | 246/244 of segment 501<br>242a/242b of segment 512<br>246/244 of segment 513<br>242c/242d of segment 524<br>246/244 of segment 525<br>242e/242f of segment 536 | 0.1214″ |
| 41″ | 128.80″ | 407.19″ | 128.65″ | 244/245 of segment 501<br>242a/242b of segment 512<br>244/245 of segment 513<br>242c/242d of segment 524<br>244/245 of segment 525<br>242e/242f of segment 536 | 0.146″ |

Reference is made to Table IV from which it can be seen that a 43½″ diameter tire has a circumference of approximately 136.66″. Thus, if the precure from the matrix cavity 260′ of FIG. 31 is cut through the pitch plane of the pitch 242b of the section 512, and the pitch plane 241 of the section 513, and also cut through the pitch plane of the pitch 242d of the segment 524 and 241 of the segment 525, three precure segments will be produced, each having a length of 135.73″. Therefore, each 135.73″ length of precure segment need be stretched but 0.93″ to accommodate a 136.66″ circumference of 43½″ diameter tire which is easily accommodated since the precure segment of 135.73″ can readily be stretched a minimum, of 1″ (or more). Thus, the stretch of 0.93″ per 135.73″ of precure segment is virtually negligible and permits each length of precure segment to be applied evenly to an associated tire of 43½″ diameter in the absence of heavy spots or gaps between the precure tread and the buffed tire and, most importantly, with perfect matching across the splice of each precure segment because, of course, the cutting across or through the pitch planes latter-described is across tread configuration of the matrix cavity 260′ which matches across these pitch planes. In other words, the precure segment of the section 301 would be spliced at the plane of the pitch face 242b of the segment 512 which would match the tread configuration across the pitch face of the pitch 244 of the segment 501. Similarly, the precure segment corresponding to the section 302 would be spliced across the abutting pitch faces of the pitch 242d of the segment 524 and the pitch face of the pitch 241 of the segment 513.

Assuming a 43¼″ tire is to be retreaded, Table IV indicates that a tire of this diameter has a circumference of 135.87″. Accordingly, the exact precure segment lengths (135.73″) are utilized and the precure is cut exactly as that described relative to the 43½″ diameter tire. However, in this case when the precure lengths are each applied to the circumference (135.87″) of a 43¼″ diameter tire, each would have to be stretched 0.144″, again, a very moderate and acceptable distance.

In the case of a 42¾″ diameter having a circumference of 134.3″ (Table IV), the 407.19″ total precure length is cut into three segments each having a length of 134.23″. This is accomplished by cutting the total length of precure in exactly the same manner as described relative to the 43½″ and/or 43¼″ tire diameters resulting in three precure lengths of 135.73″. Each of these precure segments is then cut across a pitch plane corresponding to the pitch planes between the pitches 242a, 242b, of the segment 512, the pitch plane between the segments 242c, 242d of the segment 524, and the pitch plane between the pitches 242e, 242f of the segment 536. This effectively removes a piece of precure corresponding to the pitches 242b, 242d and 242f, each having a length of 1.4999″. Subtracting 1.4999″ from 135.73″ is approximately 134.23″ per length of precure segment cut from the corresponding mold precure sections 301, 302 and 303. Each precure segment 134.23″ is therefore extremely close to the 134.3″ tire circumference requiring only a very modest stretch of 0.069″ per tire circumference. Obviously, there is also a loss of approximately 4.5″ of precure (total of 242b, 242d and 242f), but this is minimal when compared to the fact that a single mold 270′ is all that a retreader requires to mold precure to retread numerous different diametered tires.

In order to retread a 42¼″ diameter tire having a 132.73″ circumference, a precure segment of 132.73″ is obtained from each section 301, 302, 303. In this case the total precure length is cut as was described relative to the 43½″ or 43¼″ tire diameters, but now the precure segments are cut along pitch planes corresponding to the pitch plane between the pitches 242a, 245 of the segment 512; 242c, 245 of the segment 524 and 242e, 245 of the segment 536. This effectively removes approximately 3″ from each precure segment, namely, the total length of the pitches 242a, 242b; 242c, 242d and 242e, 242f per section 301, 302, and 303, respectively. Therefore, 135.73″ reduced by 3″ is 132.73″ per precure segment which corresponds exactly to the circumference of a 42¼″ diameter tire which obviously means there is no stretch involved at the splice of each tire.

A 41½″ tire has a circumference of 130.37″, and in this case the total precure segment length (407.19″) is cut as follows: The precure length is cut at the pitch plane between the pitches 246, 244 of the segment 501 and between the pitches 242a, 242b of the segment 512. This effectively removes the total length of the pitches 242b, 241 and 246 which achieves a length of 130.24″ for the precure segment 301 which in turn requires 0.1214″ of stretch. The precure is also cut as further set forth in Table IV to achieve two other precure segments corresponding to the sections 302, 303, each of 130.24″.

In the final example, the 41" diameter tire has a 128.8" circumference which is best matched by a precure segment having a length of 128.65" which is achieved by cutting the precure as set forth in Table IV resulting in each precure segment having a length of 128.65" requiring a stretch of 0.146" per tire circumference. This obviously removes a piece of the total precure corresponding to the length of the pitches 241, 246 and 244 of the segment 501 and the pitch 242b of the segment 512, which is a total length of 7.08". The precure of the other mold sections 302, 303 is cut along corresponding pitch planes resulting in the formation of three precure segments each of approximately 128.65" necessitating not only a stretch of a nominal 0.146" but also a loss of approximately 21" of precure. However, even 21" of precure loss is far outweighed by the tread matching heretofore noted and the minimal investment involved in the utilization of essentially a single mold 270' and a series of specifically utilized pitches 241-246 to achieve a single length precure (407.4") which through selective pitch plane cutting achieves multiple diameter/circumference tire retreading with tread matching at all splices. Gaps and excessive tension at each retread splice, as is now conventional, is completely eliminated, as is excessive stretching. Presently when conventional precure is excessively stretched, the ends stretch more than the middle causing a thin section of tread adjacent the splice. Normally, the precure is also thicker diametrically opposite the splice. Therefore, excessive stressing occurs in the area of the splice and there is excessive rubber remote therefrom. Furthermore, if the precure is too long it will crowd or bulk at one or more portions along the tire circumference which results in one or more humps, and these are usually accompanied by a weak bond between the buffed tire and the precure tread. Obviously any one of these problems can provide balancing and alignment difficulties, but all are essentially entirely eliminated by the present invention.

In further accordance with this invention, a full circle curing tube or a curing bladder can be inserted in the tire T (FIG. 3) and pressurized to urge the new rubber on the tire T into intimate engagement with the tread configuration 60 of the mold cavity 40. A typical bladder of this type is fully disclosed in U.S. Pat. No. 3,990,821 in the name of Kenneth T. MacMillan mentioned earlier herein. Furthermore, the apparatus 10 can be used to manufacture annular precure, as opposed to retreading the tire T. In this case an annular piece of rubber or like material is inserted into the mold cavity 40 when the mold sections 11-14 are opened, after which the latter are closed and a precure curing tube (not shown) located between the annular piece of rubber and the hub 50 is inflated to force the precure radially outwardly into intimate engagement with the mold cavity configuration 60. Subsequently the mold sections 11-14 are opened and the annular precure is removed therefrom. If the precure has a circumference of 132.73" (see Table IV), it will match a 42¼" diameter tire and need but be stretched slightly, the tire encircled thereby, and subsequently cured thereto in a convention manner. If, however, the circumferential length of the annular precure is 135.73" or 134.23" (see Table IV), the annular precure can still be stretched well beyond the 0.93", 0.144" and 0.069" to accommodate tire diameters of 43½", 43¼" and 42¾", respectively. Just as obviously, any of the annular precure segments can be cut across the pitch planes thereof in the manner heretofore described, and an appropriate piece of precure removed, and the remaining precure length encircled about and/or stretched relative to an associated buffed tire, spliced, and cured thereto. The cutting and matching of an annular precure corresponds identically to that heretofore described more specifically which is hereat incorporated by reference in order not to unduly length this record.

Though the apparatus and method described relative to FIG. 31 and Table IV dealt with cutting a precure of 407.19" length into three precure segments each of the same length, it is also within the scope of this invention to cut the total length (407.19") of precure into a variety of lengths to fit any combination of three tires of equal or different diameters, as are set forth in Table IV. For example, if one were interested in retreading three tires of 43½", 43¼" and 42¾", two of the precure segments would be cut to 135.73" and the third precure segment would be cut to 134.23". The two larger precure segments would be used to retread the 43½" and 43¼" diameter tires while the smaller precure segment would be used to retread the 42¾" tire (see Table IV).

It is also in keeping with the present invention to construct a mold which would have a total length of only one of the sections 301, 302 or 303. A precure from one of these molds would be 135.73" long and would, of course, fit any of the tires of Table IV. Thus, a press or platen 135.73" (11'3¾") long could be used to make three separate precure segments each 135.73" long and, if cut across the pitch planes (or not), the effect of three such precure segments formed in an individual shorter press one-third the length of the platen 270' effectively produces three separate precure segments which collectively total 407.19". A platen/press of this lesser one-third length would be obviously more inexpensive to build, easier to load and unload, shorter precure segments produced thereby would be easier to handle, and would be perhaps more cost effective in a low demand retread operation.

Although a preferred embodiment of the invention has been specifically illustrated and described herein, it is to be understood that minor variations may be made in the apparatus and the method without departimg from the spirit and scope of the invention, as defined in the appended claims.

I claim::

1. Apparatus for molding tire treads of different lengths comprising a plurality of segments, each segment being formed of a plurality of interchangeable pitches, said plurality of pitches defining a mold having a mold cavity, said pitches each having opposite transverse faces, a traverse face of each adjacent pair of pitches being in generally face-to-face abutment with each other in a closed position of said mold, at least several of said pitches being of different lengthwise sizes, said pitches in the closed position of said mold defining a predetermined mold configuration which includes portions at angles to the length of the tire treads molded in said mold cavity, and said mold configuration being defined by tread configuration means for matching at all abutting transverse faces of said pitches irrespective of the location of said pitches relative to each other and irrespective of the number of said pitches whereby said mold configuration matches itself lengthwise across all of said transverse faces and tire treads of different lengths but the generally same predetermined tread configuration can be molded in the same mold.

2. The molding apparatus as defined in claim 1 wherein said mold in the closed position thereof is of a generally elongated and uniplanar configuration.

3. The molding apparatus as defined in claim 1 wherein said mold in the closed position thereof is of a generally annular configuration.

4. The molding apparatus as defined in claim 1 wherein said mold in the closed position thereof is of a generally elongated and uniplanar configuration, and means for releasably securing said pitches in the face-to-face abutment thereof.

5. The molding apparatus as defined in claim 1 wherein said mold in the closed position thereof is of a generally annular configuration, means for releasably securing said pitches together in at least two groups, means for relatively radially moving said groups to open and close said mold and means for effecting circumferential movement of at least one of said groups to open and close said mold.

6. Apparatus for molding tire treads of different lengths comprising a plurality of segments, each segment being formed of a plurality of interchangeable pitches, said plurality of pitches defining a mold having a mold cavity, said pitches each having opposite transverse faces, a traverse face of each adjacent pair of pitches being in generally face-to-face abutment with each other in a closed position of said mold, all of said pitches being of the same lengthwise size, said pitches in the closed position of said mold defining a predetermined mold configuration which includes portions at angles to the length of the tire treads molded in said mold cavity, and said mold configuration being defined by tread configuration means for matching at all abutting transverse faces of said pitches irrespective of the location of said pitches relative to each other and irrespective of the number of said pitches whereby said mold configuration matches itself lengthwise across all of said transverse faces and tire treads of different lengths but the generally same predetermined tread configuration can be molded in the same mold.

7. The molding apparatus as defined in claim 6 wherein said mold in the closed position thereof is of a generally elongate and uniplanar configuration.

8. The molding apparatus as defined in claim 6 wherein said mold the closed position thereof is of a generally annular configuration.

9. The molding appartus as defined in claim 6 wherein said mold in the closed position thereof is of a generally elongated and uniplanar configuration, and means for releasably securing said pitches in the fact-to-face abutment thereof.

10. The molding apparatus as defined in claim 6 wherein said mold in the closed position thereof is of a generally annular configuration, means for releasably securing said pitches together in as least two groups, means for relatively radially moving said groups to open and close said mold, and means for effecting circumferential movement of at least one of said groups to open and close said mold.

11. Apparatus for molding tire treads of different diameters comprising a plurality of segments, each segment being formed of a plurality of interchangeable pitches, said plurality of pitches defining a mold having a generally annular mold cavity, said pitches each having opposite generally radial faces, a radial face of each adjacent pair of pitches being in generally face-to-face abutment in a closed position of said mold, at least several of said pitches being of different circumferential sizes, said pitches in the closed position of said mold defining a predetermined mold configuration which includes portions at angles to the length of the tire treads molded in said mold cavity, and said mold configuration being defined by tread configuration means for matching at all abutting radial faces of said pitches irrespective of the location of said pitches relative to each other and the number of said pitches whereby said mold configuration matches itself lengthwise across all of said radial faces and tire treads of different diameters but the generally same predetermined tread configuration can be molded in the same mold.

12. The molding apparatus as defined in claim 11 including means for releasably securing said pitches together in at least two groups, means for relatively radially moving said groups to open and close said mold, and means for effecting circumferential movement of at least one of said groups to open and close said mold.

13. The molding apparatus as defined in claim 11 including means for releasably securing said pitches together in at least two groups, and means for effecting circumferential and radial movement of at least one of said groups to open and close said mold.

14. The molding apparatus as defined in claim 11 including means for releasably securing said pitches together in at least two groups, means for effecting circumferential and radial movement of at least one of said groups to open and close said mold, and means for generally preventing circumferential movement of at least another of said groups to open and close said mold.

15. The molding apparatus as defined in claim 11 including means for releasably securing said pitches together in at least two groups, means for effecting circumferential and radial movement of at least one of said groups to open and close said mold, and means for generally preventing circumferential movement but effecting radial movement of at least another of said groups to open and close said mold.

16. The molding apparatus as defined in claim 11 wherein said plurality of pitches are disposed in a plurality of groups and at least two of said plurality of groups are each carried by one of a plurality of movable carriers, and means for moving said movable carriers relative to each other to open and close said mold.

17. The molding apparatus as defined in claim 11 wherein said plurality of pitches are disposed in a plurality of groups and at least two of said plurality of groups are each carried by one of a plurality of movable carriers, means for moving said movable carriers relative to each other to open and close said mold, and means for releasably securing together the pitches of each group.

18. The molding apparatus as defined in claim 11 wherein said plurality of pitches are disposed in a plurality of groups and at least two of said plurality of groups are each carried by one of a plurality of movable carriers, means for moving said movable carriers relative to each other to open and close said mold, and means for effecting circumferential movement of at least one of said groups relative to its carrier.

19. The molding apparatus as defined in claim 11 wherein said plurality of pitches are disposed in a plurality of groups and at least two of said plurality of groups are each carried by one of a plurality of movable carriers, ,means for moving said movable carriers relative to each other to open and close said mold, and means for effecting radial movement of at least one of said groups relative to its carrier.

20. The molding apparatus as defined in claim 11 wherein said plurality of pitches are disposed in a plurality of groups and at least two of said plurality of groups are each carried by one of a plurality of movable carriers, means for moving said movable carriers relative to each other to open and close said mold, a first and second of said groups being carried by a first carrier, means for effecting circumferential movement of said first group relative to said first carrier, and means for effecting radial movement of said second group relative to said first carrier.

21. The molding apparatus as defined in claim 11 wherein said plurality of pitches are disposed in a plurality of groups and at least two of said plurality of groups are each carried by one of a plurality of movable carriers, means for moving said movable carriers relative to each other to open and close said mold, a first and second of said groups being carried by a first carrier, means for effecting circumferential movement of said first group relative to said first carrier, means for effecting radial movement of said second group relative to said first carrier, and means for generally preventing circumferential movement of said second group relative to said first carrier.

22. The molding apparatus as defined in claim 11 wherein said plurality of pitches are disposed in a plurality of groups and at least two of said plurality of groups are each carried by one of a plurality of movable carriers, means for moving said movable carriers redelative to each other to open and close said mold, a first and second of said groups being carried by a first carrier, a third and fourth of said groups being carried by a second carrier, means for effecting circumferential movement of said first and third group relative to the respective first and second carriers, and means for effecting radial movement of said second sand fourth groups relative to said first and second carriers.

23. The molding apparatus as defined in claim 11 wherein said plurality of pitches are disposed in a plurality of groups and at least two of said plurality of groups are each carried by one of a plurality of movable carriers, means for moving said movable carriers relative to each other to open and close said mold, a first and second of said groups being carried by a first carrier, a third and fourth of said groups being carried by a second carrier, means for effecting circumferential movement of said first and third group relative to the respective first and second carriers, means for effecting radial movement of said second and fourth groups relative to said first and second carriers, and means for generally preventing circumferential movement of said second and fourth groups relative to the respective first and second carriers.

24. The molding apparatus as defined in claim 11 wherein said plurality of pitches are disposed in a plurality of groups and at least two of said plurality of groups are each carried by one of a plurality of movable carriers, means for moving said movable carriers relative to each other to open and close said mold, each pitch group has opposite end pitches, and end pitches of each adjacent pair of pitch groups are in spaced relationship when said mold cavity is open.

25. The molding apparatus as defined in claim 16 including means for effecting circumferential movement of at least one of said groups relative to its carrier, and means limiting the circumferential movement of said last-mentioned group and carrier.

26. The molding apparatus as defined in claim 16 including means for effecting radial movement of at least one of said groups relative to its carrier, and means limiting the radial movement of said last-mentioned group and carrier.

27. The molding apparatus as defined in claim 11 wherein said plurality of pitches are disposed in a plurality of groups and at least two of said plurality of groups are each carried by one of a plurality of movable carriers, means for moving said movable carriers relative to each other to open and close said mold, a first and second of said groups being carried by a first carrier, means for effecting circumferential and radial movement of said first group relative to said first carrier, and means for effecting at least radial movement of said second group relative to said first carrier.

28. The molding apparatus as defined in claim 11 wherein said plurality of pitches are disposed in a plurality of groups and at least two of said plurality of groups are each carried by one of a plurality of movable carriers, means for moving said movable carriers relative to each other to open and close said mold, a first and second of said groups being carried by a first carrier, means for effecting circumferential and radial movement of said first group relative to said first carrier, means for effecting at least radial movement of said second group relative to said first carrier, and means for generally preventing circumferential movement of said second group relative to said first carrier.

29. The molding apparatus as defined in claim 16 including means for circumferentially biasing at least two adjacent groups away from each other during the opening of said mold.

30. Apparatus for molding tire treads of different diameters comprising a plurality of mold sections, means for effecting relative movement of at least two of said mold sections between open and closed positions of said mold, a plurality of matrix segments carried by each mold section, means mounting at least one of said matrix segments for radial and circumferential movement, a plurality of interchangeable pitches carried by each matrix segment, at least several of said pitches being of different circumferential sizes, said plurality of pitches in the closed position defining a mold having a generally annular mold cavity of a predetermined mold configuration which includes portions at angles to the length of the tire treads moldeds in said mold cavity, said pitches each having opposite generally radial faces, a radial face of each adjacent pair of pitches being in generally face-to-face abutting relationship with each other in the closed position of said mold, and said mold configuration being defined by tread configuration means for matching at all abutting radial faces of said pitches irrespective of the location of said pitches relative to each other and irrespective of the number of said pitches per matrix segment whereby said mold configuration matches itself lengthwise across all of said radial faces and tire treads of different diameters but the generally same tread configuration can be molded in the same mold.

31. The molding apparatus as defined in claim 30 wherin a circumferential plane normal to an axis of said annular mold cavity passes through matching circumferentially adjacent mold portions of all pitches.

32. The molding apparatus as defined in claim 30 wherein said predetermined mold configuration is of variable pitch and a circumferential plane normal to the central axis of said annular mold cavity passes through matching circumferentially adjacent mold portions of all pitches.

33. The molding apparatus as defined in claim 30 including means for releasable securing together the plurality of pitches of each matrix segment.

34. The molding apparatus as defined in claim 30 including means for effecting circumferential movement of at least one matrix segment relative to its mold section during mold opening and closing.

35. The molding apparatus as defined in claim 30 including means for effecting circumferential and radial movement of at least one matrix segment relative to its mold section during mold opening and closing.

36. The molding apparatus as defined in claim 30 including means for biasing at least two adjacent matrix segments circumferential away from each other during mold opening movement.

37. The molding apparatus as defined in claim 30 including a generally annular heater carried by each mold section, said annular heaters each having a generally circumferential surface portion in abutment with the associated matrix segments, said circumferential surface portions defining a predetermined heater circumference when said mold is closed, said pitches defining a range of different tire diameters/circumferences which can be molded in said mold, means for effecting pitch changes for molding tires ranging between predetermined maximum and minimum tire diameters/circumferences, and said mold sections, annular heaters and matrix segments being constructed and arranged so as to effect mold closure between said maximum and minimum tire diameters/circumferences without mold section or annular heater change or alteration.

38. The molding apparatus as defined in claim 30 including a generally annular heater carried by each mold section, said annular heaters each having a generally circumferential surface portion in abutment with the associated matrix segments, said circumferential surface portions defining a predetermined heater circumference when said mold is closed, said pitches defining a range of different tire diameters/circumferences which can be molded in said mold, means for effecting pitch changes for molding tires ranging between predetermined maximum and minimum tire diameters/circumferences, and said mold sections, annular heaters and matrix segments being constructed and arranged so as to effect mold closure between said maximum and minimum tire diameters/circumferences without mold section or annular heater change or alteration by establishing said heater circumference less than said predetermined maximum tire diameter/circumference.

39. The molding apparatus as defined in claim 30 including at least three matrix segments carried by one of said mold sections, each of said three matrix segments having circumferentially endmost pitches, and means for releasably securing at least one endmost pitch to each of the endmost of said three matrix segments.

40. Apparatus for molding tire treads of different lengths comprising a plurality of segments, each segment being formed of a plurality of interchangeable pitches, said plurality of pitches defining a mold having a mold cavity, said pitches each having opposite transverse faces, a traverse face of each adjacent pair of pitches being in generally face-to-face abutment with each other in a closed position of said mold, at least several of said pitches being of different lengthwise sizes, said pitches in the closed position of said mold defining a predetermined mold configuration which includes portions at angles to the length of the tire treads molded in said mold cavity, and said mold configuration being defined by tread configuration means for matching at all abutting transverse faces of said pitches including across said mold configuration angled portions irrespective of the location of said pitches relative to each other and irrespective of the number of said pitches whereby said mold configuration mathces itself lengthwise across all of said transverse faces and tire treads of different lengths but the generally same predetermined tread configuration can be molded in the same mold.

41. The molding apparatus as defined in claim 40 wherein said mold configuration angled portions are upstanding mold ribs.

42. The molding apparatus as defined in claim 40 wherein said mold configuration angled portions are lands.

43. The molding apparatus as defined in claim 40 wherein said mold configuration angled portions are mold ribs and lands.

44. The molding apparatus as defined in claim 40 wherein several pitches in each of at least two of said segments are each of a particular and different lengthwise size.

45. The molding apparatus as defined in claim 40 wherein several pitches in each of at least two of said segments are each of a particular and identical lengthwise size.

46. The molding apparatus as defined in claim 40 wherein said mold cavity is of a generally annular configuration, and a circumferential plane normal to an axis of said annular mold cavity passes through matching circumferentially adjacent mold portions of all pitches.

47. The molding apparatus as defined in claim 40 wherein said mold cavity is of a generally annular configuration, a circumferential plane normal to an axis of said annular mold cavity passes through matching circumferentially adjacent mold portions of all pitches, and said predetermined mold configuration is of varible pitch.

48. The molding apparatus as defined in claim 1 wherein said mold configuration angled portions are upstanding mold ribs.

49. The molding apparatus as defined in claim 1 wherein said mold configuration angled portions are lands.

50. The molding apparatus as defined in claim 1 wherein said mold configuration angled portions are mold ribs and lands.

51. The molding apparatus as defined in claim 1 wherein several pitches in each of at least two of said segments are each of a particular and different lengthwise size.

52. The molding apparatus as defined in claim 1 wherein several pitches in each of at least two of said segments are each of a particular and identical lengthwise size.

53. The molding apparatus as defined in claim 1 wherein said mold cavity is of a generally annular configuration, and a circumferential plane normal to an axis of said annular mold cavity passes through matching circumferentially adjacent mold portions of all pitches.

54. The molding apparatus as defined in claim 1 wherein said mold cavity is of a generally annular configuration, a circumferential plane normal to an axis of said annular mold cavity passes through matching circumferentially adjacent mold portions of all pitches, and said predetermined mold configuration is of varible pitch.

55. The molding apparatus as defined in claim 6 wherein said mold configuration angles portions are upstanding mold ribs.

56. The molding apparatus as defined in claim 6 wherein said mold configuration angled portions are lands.

57. The molding apparatus as defined in claim 6 wherein said mold configuration angled portions are mold ribs and lands.

58. The molding apparatus as defined in claim 6 wherein several pitches in each of at least two of said segments are each of a particular and different lengthwise size.

59. The molding apparatus as defined in claim 6 wherein several pitches in each of at least two of said segments are each of a particular and identical lengthwise size.

60. The molding apparatus as defined in claim 6 wherein said mold cavity is of a generally annular configuration, and a circumferential plane normal to an axis of said annular mold cavity passes through matching circumferentially adjacent mold portions of all pitches.

61. The molding apparatus as defined in claim 6 wherein said mold cavity is of a generally annular configuration, a circumferential plane normal to an axis of said annular mold cavity passes through matching circumferentially adjacent mold portions of all pitches, and said predetermined mold configuration is of variable pitch.

62. The molding apparatus as defined in claim 11 wherein said mold configuration angled portions are upstanding mold ribs.

63. The molding apparatus as defined in claim 11 wherein said mold configuration angled portions are lands.

64. The molding apparatus as defined in claim 11 wherein said mold configuration angled portions are mold ribs and lands.

65. The molding apparatus as defined in claim 11 wherein several pitches in each of at least two of said segments are each of a particular and different lengthwise size.

66. The molding apparatus as defined in claim 11 wherein several pitches in each of at least two of said segments are each of a particular and identical lengthwise size.

67. The molding apparatus as defined in claim 11 wherein said mold cavity is of a generally annular configuration, and a circumferential plane normal to an axis of said annular mold cavity passes through matching circumferentially adjacent mold portions of all pitches.

68. The molding apparatus as defined in claim 11 wherein said mold cavity is of a generally annular configuration, a circumferential plane normal to an axis of said annular mold cavity passes through matching circumferentially adjacent mold portions of all pitches, and said predetermined mold configuration is of variable pitch.

69. The molding apparatus as defined in claim 30 wherein said mold configuration angled portions are upstanding mold ribs.

70. The molding apparatus as defined in claim 30 wherein said mold configuration angled portions are lands.

71. The molding apparatus as defined in claim 30 wherein said mold configuration angled portions are mold ribs and lands.

72. The molding apparatus as defined in claim 30 wherein several pitches in each of at least two of said segments are each of a particular and different lengthwise size.

73. The molding apparatus as defined in claim 30 wherein several pitches in each of at least two of said segments are each of a particular and identical lengthwise size.

74. The molding apparatus as defined in claim 30 wherein said mold cavity is of a generally annular configuration, and a circumferential plane normal to an axis of said annular mold cavity passes through matching circumferentially adjacent mold portions of all pitches.

75. The molding apparatus as defined in claim 30 wherein said mold cavity is of a generally annular configuration, a circumferential plane normal to an axis of said annular mold cavity passes through matching circumferentially adjacent mold portions of all pitches, and said predetermined mold configuration is of variable pitch.

* * * * *